US011734816B2

(12) United States Patent
Cochran et al.

(10) Patent No.: US 11,734,816 B2
(45) Date of Patent: Aug. 22, 2023

(54) TRAY INSERTS AND IMAGE QUALITY, SYSTEMS, METHODS AND ALGORITHMS FOR QUANTIFYING TRAY'S IMPACT USING THE SAME

(71) Applicant: Battelle Memorial Institute, Columbus, OH (US)

(72) Inventors: Joseph Matthew Cochran, Egg Harbor Township, NJ (US); Matthew Robert Aderholdt, Vineland, NJ (US); Jesse Thomas Buxton, Columbus, OH (US); Laura Lee Strang Aume, Circleville, OH (US); John Tatarowicz, Blackwood, NJ (US); Rodney Hallgren, Philadelphia, PA (US); John W. Penwell, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 17/863,678

(22) Filed: Jul. 13, 2022

(65) Prior Publication Data
US 2022/0392044 A1    Dec. 8, 2022

Related U.S. Application Data

(63) Continuation of application No. 17/365,693, filed on Jul. 1, 2021, now Pat. No. 11,430,109.
(Continued)

(51) Int. Cl.
G06K 9/00  (2022.01)
G06T 7/00  (2017.01)
(Continued)

(52) U.S. Cl.
CPC ........... *G06T 7/001* (2013.01); *G01N 23/046* (2013.01); *G01N 23/083* (2013.01); *G01N 23/10* (2013.01);
(Continued)

(58) Field of Classification Search
CPC ............... G02B 27/48; G02B 19/0014; G02B 19/009; G02B 26/10; G02B 19/0085;
(Continued)

(56) References Cited

U.S. PATENT DOCUMENTS 6,813,374 B1   11/2004  Karimi et al.
8,934,608 B2    1/2015  Barty
(Continued)

OTHER PUBLICATIONS

International Search Report and Written Opinion dated Dec. 20, 2021 for PCT Application No. PCT/US21/40140, 12 pages.

*Primary Examiner* — Alex Kok S Liew
(74) *Attorney, Agent, or Firm* — Benesch, Friedlander, Coplan & Aronoff LLP

(57) ABSTRACT

Various tray inserts, methods and algorithm for certifying candidate trays for use in an X-ray scanner system are discussed. The tray insert includes at least a body having multiple parts positioned for generation of image quality metrics for tray impact evaluation in; a first cover and a second cover disposed at opposite ends to fix and secure the body. The method including running an algorithm to control an X-ray system to collect baseline image data from certified trays, collecting candidate tray image data, extracting image quality metrics for both the baseline image data and the candidate tray image data, and performing statistical analysis using and comparing image quality metrics from the baseline image data and the candidate tray image data to certify the candidate tray based on the statistical and comparison results.

8 Claims, 38 Drawing Sheets

Related U.S. Application Data

(60) Provisional application No. 63/047,639, filed on Jul. 2, 2020.

(51) Int. Cl.
   *G01N 23/10* (2018.01)
   *G01N 23/046* (2018.01)
   *G01N 23/083* (2018.01)

(52) U.S. Cl.
   CPC ............ *G01N 2223/04* (2013.01); *G01N 2223/3308* (2013.01); *G01N 2223/419* (2013.01); *G01N 2223/643* (2013.01); *G06T 2207/10116* (2013.01); *G06T 2207/20076* (2013.01); *G06T 2207/30164* (2013.01); *G06T 2207/30168* (2013.01)

(58) Field of Classification Search
   CPC ......... G02B 27/095; G02B 19/0052; G02B 19/0095; G02B 19/0028; G02B 19/0057; G02B 19/0066; G02B 26/105; G02B 27/0961; G02B 27/0966; G02B 26/106; G02B 26/0875; G06V 20/62; G06V 30/144; G06V 2201/05; G06V 20/52; G06V 10/25; G06V 10/761; G06V 10/7715; G06V 20/80; G06V 10/82; G06V 20/20; G06V 20/653; G06V 20/70; G06V 2201/03
   See application file for complete search history.

(56) References Cited

U.S. PATENT DOCUMENTS

| | | |
|---|---|---|
| 10,663,616 B2 | 5/2020 | Morton |
| 2005/0036689 A1* | 2/2005 | Mahdavieh .......... G01V 5/0008 382/199 |
| 2011/0051996 A1* | 3/2011 | Gudmundson ...... G01N 23/083 382/100 |
| 2011/0206240 A1* | 8/2011 | Hong ................... G06V 20/52 382/103 |
| 2017/0276824 A1 | 9/2017 | Atherton et al. |

\* cited by examiner

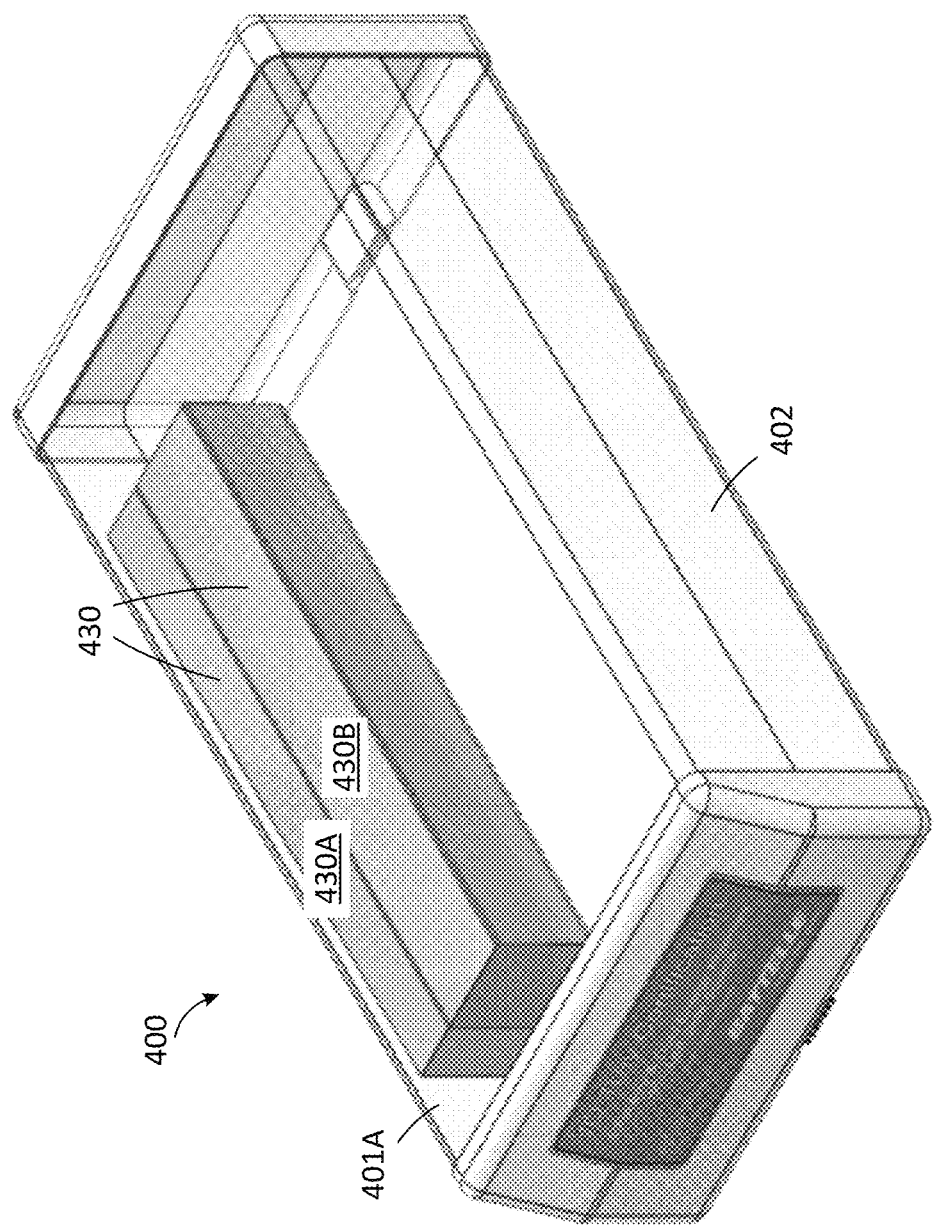

YZ Plane

YZ Plane   1970 Tray Design Element
Providing Structural
Support Within the Tray

TRAY INSERTS AND IMAGE QUALITY, SYSTEMS, METHODS AND ALGORITHMS FOR QUANTIFYING TRAY'S IMPACT USING THE SAME

CROSS REFERENCED TO RELATED APPLICATION

The present application claims the benefit of priority under 35 U.S.C. § 120 as a continuation from U.S. patent application Ser. No. 17/365,693 entitled "TRAY INSERTS AND IMAGE QUALITY, SYSTEMS, METHODS AND ALGORITHM FOR QUANTIFYING TRAY'S IMPACT USING THE SAME," filed on Jul. 1, 2021, which claims the benefit of priority under 35 U.S.C. § 119 from U.S. Provisional Patent Application Ser. No. 63/047,639 entitled "Tray Inserts", filed on Jul. 2, 2020, the contents of which are herein incorporated by reference in their entirety for all purposes.

TECHNICAL FIELD

The present application relates generally to tray inserts, image quality, systems, methods and algorithms developed for quantifying a candidate tray's impact to the X-ray system's ability to collect quality images through the use of certified trays (ECAC certified) by the tray inserts. The method and algorithm may be used to certify unknown or new trays and provide feedback to trays manufacturer for redesign for compliance.

BACKGROUND

Computed tomography (CT) and transmission (2D) X-ray systems are commonly used in the screening for explosive threats for both hold and cabin baggage (CB) in airports around the world. Variants of these systems referred to as Explosive Detection Systems (EDS) employ automated explosive detection algorithms that are certified to the European Union (EU) detection standard using the European Civil Aviation Conference (ECAC) Common Testing Methodology (CTM). Trays or bins are used to transport luggage and divested contents from passengers through the systems. Automated security lanes integrate tray return systems to these X-ray systems, helping increase screening efficiency by allowing simultaneous divesture of multiple passengers and remote screening cap abilities. Recent mandates that require the use of CT for security screening as well as increased passenger volume in the flight transportation have greatly increased the demand for trays at airports. Typically, trays used in these systems pose a challenge for regulators and certifying test laboratories because of different variations in tray designs that may negatively impact X-ray system certified threat detection performance.

In order to overcome this issue, trays and X-ray system configurations must be tested and certified together. This ensures that detection performance for a given screening technology can perform at the certified level for a given tray type. If a tray is not tested with an X-ray system (e.g., an X-ray system applying an EDS/EDS-CB technology), the tray cannot be used with the X-ray systems, thereby limiting tray options to airports. Airports typically demand a variety of tray types to accommodate their typical passenger divesture and hold baggage needs. Tray manufacturers have designed new trays to meet such a demand, thereby increasing the number of combinations of trays and X-ray systems.

Certain tray designs (i.e., physical configurations) and materials constructions may produce artifacts causing anomalies or uncertainties to the scanned image or impact the image quality in such a way as to affect the X-ray system's detection performance. This requires each tray and X-ray system combination to be tested and certified. Airport checkpoint configurations and passenger diversity require flexibility in the type and size of tray variations. This has produced a surge in new combinations of trays and X-ray systems, testing laboratories are struggling to keep up tray certifications. The current implementation of the certification test method to certify these trays and X-ray system combinations are cumbersome, time consuming, and costly. If the trays are not tested with an X-ray system, the trays cannot be used, limiting tray options to airports.

SUMMARY

The present application discloses tray inserts for certifying trays for use in an X-ray system, which substantially solve one or more existing technical problems due to limitations and disadvantages of the related art. The present application also discloses a method and an algorithm to quantify tray's impact to image quality in the X-ray system.

In an example, different types of tray inserts are disclosed. In an example, a tray insert may include a body, the body having multiple parts removably positioned and prearranged therein for generation of image quality metrics for tray impact evaluation in an X-ray system. The tray insert also includes a first cover disposed at a first end of the body; and a second cover disposed at a second end of the body, wherein the first cover and the second cover are configured to fix and secure the body at both ends.

The tray inserts may provide a better solution to support the certification of trays that can be performed quickly and at reduced cost while providing confidence that detection performance is not impacted by the tray. The tray inserts may allow us to quantify impact of a tray on image quality. Further, there may be an acceptance threshold and statistical test to objectively determine whether the tray can be used with a particular X-ray system without impacting the threat detection performance.

In another example, a computer implemented method to quantify X-ray scanner system's image quality impact by a candidate tray is disclosed. The method includes executing by at least a processor in a computer, at least one code stored in a non-transitory computer-readable medium which causes the computer to control an X-ray scanner system to quantify candidate tray imp act, by performing the following steps: collecting baseline image data for the X-ray scanner system that includes characteristic image quality data collected from a plurality of certified trays that have previously been scanned with a plurality of selected tray inserts; collecting one or more candidate trays image data for the X-ray scanner system that includes characteristic image quality data collected from the one or more candidate trays that have been scanned with a same plurality of selected tray inserts; extracting image quality metrics for both the baseline image data and the one or more candidate trays image data; performing statistical analysis using the image quality metrics within a volume of interest from both the baseline image data and the candidate trays image data; and reporting or certifying the one or more candidate tray suitable for use in the X-ray scanner system based on the image quality metrics of the one or more candidate tray falling within a mean and a standard deviation of multiple Image Quality baseline metrics within the volume of interest.

The collecting of the baseline image data or the one or more candidate trays image data may include taking turns to scan by the X-ray scanner system, a same selected tray inserts which has been centrally positioned in the certified trays for a defined number of times, afterwards scanning the candidate trays using the same selected tray inserts, until all remaining selected tray inserts have been used by the plurality of certified trays or the one or more candidate trays for scanning by the X-ray scanner system.

BRIEF DESCRIPTION OF THE DRAWINGS

FIG. 4A is a perspective and assembled view illustrating a tray insert according to the fourth embodiment of this application;

DETAILED DESCRIPTION

Figure 1:
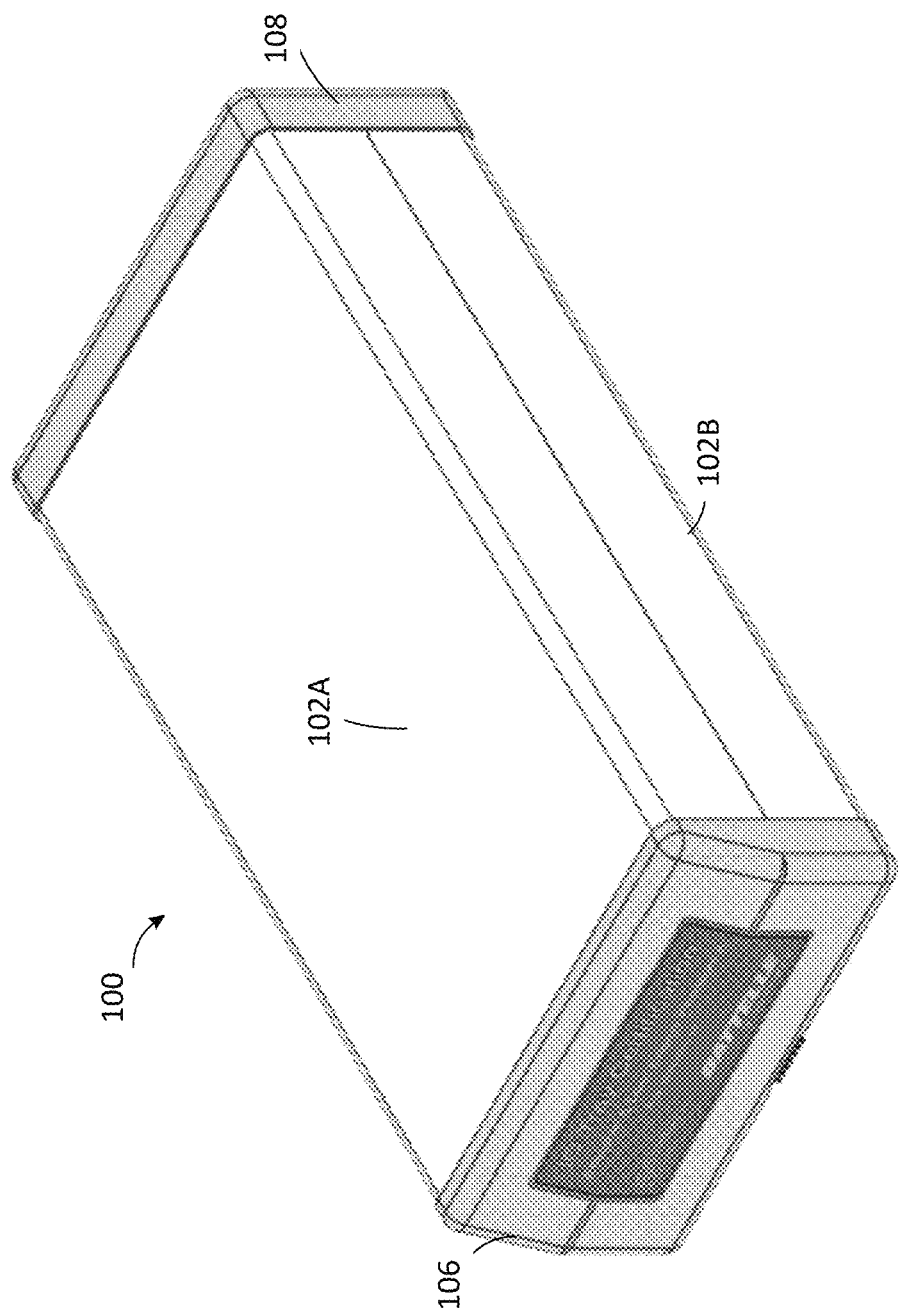
FIG. 1 is a diagram generally illustrating a tray insert according to the first embodiment of this application.

Automated threat detection (ATD) algorithms are certified to meet established regulatory threats detection requirements. These algorithms are dependent on image quality (IQ) produced by X-ray systems. Degradation of the image can occur due to defects in hardware components in the X-ray systems and even the improper setup of the system during installation. Therefore, it is critical that an X-ray system is setup and configured properly and that all hardware components are operating in a nominal state to support certified threats detection performance.

The image quality may be impacted by an imaging subsystem of X-ray screening technology (e.g., X-ray tube, power supply, belt motor). Such an imaging subsystem is unique to each platform that embodies that technology because each X-ray source, reconstruction algorithm, X-ray detector(s), conveyor belt speed, and other components may vary between manufacturers.

Also, the image quality may be impacted by a tray used together with the X-ray system. That is, different types of trays may have different impacts to the image quality. This application is directed to a potential impact a tray may have on image quality and detection performance. In order to make it easier, faster and more cost-efficient to verify/test different trays from different manufacturers through X-ray systems, this application discloses multiple Image Quality (IQ) tray inserts (i.e., phantoms) which may be used to assess and baseline multiple X-ray system IQ metrics. In other words, through the tray inserts, the problem regarding tray and X-ray system verification described above may be solved. The following description will describe the tray inserts disclosed in this application.

Generally speaking, at least one of the tray inserts (i.e., phantoms) disclosed in this application may be placed in or attached to a tray to assess any impact that the tray may have on an X-ray system's ability to detect threats. In this application, unless otherwise indicated, the terms "test tray insert", "tray insert", "insert" and "phantom" may be used interchangeably. It should be noted that in order to certify trays, besides the tray inserts, there may be the following devices needed: an X-ray device and a 3rd party computing device.

The X-ray device may be used to collect image data, e.g., images of a phantom within a candidate tray. The 3rd part computing device may be used to perform data analysis (e.g., extracting and analyzing the image quality metrics from the image data), data comparison (e.g., comparing the image quality metrics with baseline metrics). The $3^{rd}$ party computing device may be a computer, a laptop, a smart phone, or any other kind device which may be qualified to perform its functions disclosed in this application. Under some circumstances, the $3^{rd}$ party computing device and the X-ray device may be incorporated into a comprehensive system. In some cases, the $3^{rd}$ party computing device may be a part of the X-ray device. The present application does not limit the relationship between the X-ray device and the 3rd party computing device, as long as these two devices are consistent with the principles taught by this application. It should be recognized that the X-ray device is one of the main components in the X-ray system which may further include power supply device, conveyor belt, etc. Here in this application, unless otherwise indicated, the terms "X-ray system" and "X-ray device" may be used interchangeably. Also, unless otherwise indicated, the terms "3rd party computing device" and "computing device" may be used interchangeably.

The tray inserts disclosed in this application may be developed or designed based on ANSI/IEC standards, such as ANSI N42.45. The content of ANSI N42.45 is incorporated into this application by reference. Although this application incorporates standard ANSI N42.45, that standard is not intended to be exclusive or be limiting to the present application. Any other available standard related to an X-ray system and its associated tray may be applied to design a tray insert according to the principles disclosed in this application.

The tray inserts will be designed with a low profile so that they may be used to test as many types of trays as possible. In embodiments, the tray inserts may have a smaller 3D size than those trays to be tested. For example, the length, width and height of the tray inserts may be smaller than those of the trays to be tested. It should be noted that the above exemplary size of the tray inserts is not intended to be exclusive or be limiting to the present application. The 3D size of the tray inserts may vary as long as they may realize their functions disclosed in this application.

The tray inserts may be used to evaluate image quality metrics that could potentially be impacted by a tray and thereby alter the X-ray system's certified detection performance. For example, the image quality metrics may include at least one of the following: object length accuracy, CT value consistency, path length CT value and $Z_{eff}$, Noise Equivalent Quanta (NEQ), etc. Generally, the image quality metrics (e.g., metrics value/metrics data) will be obtained from the tray inserts and will be analyzed by the 3rd party computing device (e.g., a computer). For example, through the 3rd party computing device running a specifically designed algorithm, the image quality metrics (e.g., metrics data) may be compared with a baseline metrics (e.g., baseline metrics data) so as to determine whether there is a negative effect from the tray. Also, as well known, an X-ray system may be used to detect threats if the $3^{rd}$ party computing device is also running a threat detection algorithm to analyze image data collected by the X-ray system. Therefore, under that circumstance, the image quality metrics disclosed here in this application may also be related to threat detection. In other words, the image quality metrics may be used to certify trays through the tray inserts disclosed in this application on the one hand, and on the other hand, they might also be used to assess impacts on threat detection. Here in this application, unless otherwise indicated, the terms "image quality metrics" and "metrics" may be used interchangeably.

It should be appreciated that the above-mentioned exemplary metrics are not intended to be exclusive or be limiting to the metrics adopted by this application to certify trays. Any metrics may be available as long as they may be used by the $3^{rd}$ party computing device for the purpose of certifying trays. The following description will describe the metrics and with reference to detailed examples.

The basic idea of the use of the image quality metrics to certify trays for use with X-ray systems is briefly described as follows. First, a set of hardware phantoms (i.e., tray inserts) are specifically designed to fit within trays. Then, an algorithm (e.g., image quality algorithm) may be developed based on the solution that has been used for verification image quality (VIQ) acceptance testing solution on the market. Then, a statistical test may be performed by the computing device through the algorithm. For example, the computing device may perform analysis/comparison on the obtained image quality metrics by comparing those image quality metrics with the baseline metrics.

Typically, for a given X-ray system, its metrics would be approximately consistent because its image collection ability is fixed when manufactured. For example, an object length accuracy of an X-ray system may be calculated using the following equation (1).

$$\text{object length accuracy value} = \frac{\text{length}}{\text{length}_{physical}} \quad (1)$$

Here, length represents an object's length detected by the X-ray system, while $\text{length}_{physical}$ represents a physical length of the object. It will be appreciated that unless otherwise indicated, the terms "object length accuracy value" and "object length accuracy" may be used interchangeably. Similarly, when a metrics is discussed in this application, it may be directed to an Image Quality metrics value.

The X-ray system may scan a tray insert in a tray and obtain image data. Then the computing device may calculate the image data and obtain a new object length accuracy based on the tray insert in the tray. The computing device may compare the new object length accuracy value with its original object length accuracy value, and then determine whether there is an effect from the tray.

The computing device may use a metric's condition to make the determination. That is, if the metric's condition is satisfied by the comparison between a new metric's (e.g., the new object length accuracy discussed above) and an original metric's (e.g., the baseline metrics discussed above), then the computing device may determine that an effect from the tray exists. The condition may be a threshold value, a threshold difference value, etc.

In an embodiment, the condition is a threshold value for the object length accuracy. For example, in a scenario, the threshold value is 70%, while the new object length accuracy (i.e., using a tray) is 80%, greater than the threshold value (i.e., the condition is satisfied). Here, the computing device may determine that there is an effect to the image quality metric (i.e., object length accuracy) from the tray. If the image quality metric is also used for threat detection, because of the effect from the tray, the threat detection performance may be impacted too.

In an embodiment, there may be a threshold difference value for the object length accuracy. If the difference between a new metric (e.g., the new object length accuracy discussed above) and an original metric (e.g., the original object length accuracy discussed above) is greater than or equal to the threshold difference value, then the computing device may determine that the tray negatively imp acts the accuracy of detection performance (either image detection or threat detection, or both). If the difference is smaller than the threshold value, the tray may be used with this X-ray system. For example, the threshold difference value is 5%. An X-ray system's original object length accuracy (i.e., without using any tray) is 90%, while its new object length accuracy (i.e., using a tray) is 80%. Then, the difference is 10%, greater than the threshold difference value, and thus the computing device may determine that an effect from the tray exists.

It should be noted that the above example of threshold value is only given by way of example, and it's not intended to be limiting to the present application. Also, the threshold value is only one of available ways for a computing device to determine an effect from a tray. Therefore, any other available ways may be used by the computing device to make such a determination.

The above description describes how to make the determination using a specific metric, i.e., the object length accuracy. It will be appreciated that the same or similar idea/principle may also be applied to the metrics disclosed in the ANSI N42.45 Image Quality standard other than the object length accuracy. For example, the above-discussed determination regarding the effect from the tray may also be performed based on CT value consistency, Noise Equivalent Quanta (NEQ), etc.

It should be noted that such a determination may not be based on a single metric, and it may be a determination based on a combination of multiple image quality metrics. In one embodiment, the computing device may determine that an effect from the tray exists if all metrics in the combination of image quality metrics are impacted by the tray. In another embodiment, the computing device may determine that an effect from the tray exists if at least one metrics in the combination of image quality metrics are impacted by the tray.

For example, the determination may be based on both the object length accuracy and the CT value consistency. That is, the computing device will determine that an effect from the tray exists based on both object length accuracy and the CT value consistency, and only if each of the two metrics shows a negative effect from the tray, it will determine that there is such an effect from the tray. For example, there may be a first threshold value for the object length accuracy and a second threshold value for the CT value consistency. If a newly obtained object length accuracy using a tray carrying a tray insert is greater than or equal to the first threshold value and a newly obtained CT value consistency using the tray carrying the tray insert is greater than or equal to the second threshold value, then the computing device may determine that there is an effect from the tray.

Further, as security check personnel may have to assess on-screen images of baggage contents for other threat types (e.g. guns and knives), the tray inserts may include test objects to evaluate potential impacts to on-screen image quality performance. For example, the tray inserts may be used to evaluate image quality metrics that may be imp acted by a tray and thereby alter the on-screen image quality performance. Further, a threat detection algorithm may be used to process the image quality metrics so as to do threat detection. Therefore, it may be seen that using the image quality metrics to evaluate effects that trays may have on threat detection makes this a unique application of image quality metrics.

Here may be a proposed approach to how the tray inserts may be used for tray certification. ECAC has certified explosives detection performance for a number of EDS and tray combinations. For example, EDS-A with Tray-A, Tray-B, and Tray-C. The use of these three trays is approved and certified by ECAC on system EDS-A. However, trays Tray-D and Tray-F have not been certified due to detection performance issues.

For Tray-A, Tray-B, and Tray-C, acceptable thresholds of the image quality metrics may be established using one or more tray inserts disclosed in this application since these trays were already certified by ECAC. For Tray-D and Tray-F, unacceptable thresholds may be established for these tray variants to create a region of acceptable performance and unacceptable performance. Once these thresholds have been defined, these thresholds may be used to evaluate new tray variants for EDS-A. Thus, the use of the tray inserts will greatly accelerate the testing of new tray variants and will likely not require a full explosives detection certification test.

The tray inserts according to different embodiments in the present application will be described below with reference to FIGS. 1-17B, whereas FIGS. 18-21B describe the method, system and algorithm to certify other trays using image qualities of tray inserts in certified trays.

FIG. 1 generally shows a tray insert 100 according to the first embodiment. In an example, the tray insert 100 includes a body portion 102, the body portion 102 having multiple p arts removably positioned and prearranged therein (see FIGS. 2A to 16B) for generation of image quality metrics for tray impact evaluation in an X-ray system. The tray insert 100 also includes a first cover 106 disposed at a first end of the body; and a second cover 108 disposed at a second end of the body, wherein the first cover 106 and the second cover 108 are configured to fix and secure the body portion 102 at both ends.

As shown in FIG. 1, the tray insert 100 may be a cube-like device. The tray insert 100 may include: a body 102 and covers 106, 108 at each end of the body 102. The body 102 of the tray insert 100 is shown in white color in FIG. 1. The body 102 may include two parts, as shown in FIG. 1, one on the top 102A and one at the bottom 102B. The covers 106, 108 are shown in grayscale color in FIG. 1. The covers 106, 108 may be used to fix or to hold in place, the two parts 102A, 102B in the body together. Multiple parts or subparts (not shown in FIG. 1, but shown in FIGS. 2A-16B) may be incorporated within the body.

As discussed above, the tray insert 100 is designed with a low profile (i.e., relative to the depth of a tray). Here this application does not limit the size of the tray insert. Basically, the size of the tray insert may vary based on the tray size dimensions. Also, the colors shown in FIG. 1 as well as other drawings are only given by way of illustration, and they are not intended to be limiting to the design of the tray inserts. The tray insert 100 may be not transparent as shown in FIG. 1 and thus components (also known as objects, elements or parts) inside the tray insert may not be seen by a user. Alternately, the tray insert 100 may be transparent (at least the body portion 102) so that its internal structure may be seen from outside. The multiple parts (i.e., internal structures in FIGS. 2A to 16B), may be configured for screening presence of explosive threats by the X-ray system that utilizes screening technology comprising one of: two-dimensional (2-D) X-ray or X-ray computed tomography (CT).

It should be noted that the words shown on the left-end cover of the tray insert may provide some information about the tray insert, such as its manufacturer (e.g., Battelle), its Part number (e.g., 2000503-10), its measured parameters (e.g., material specific effective atomic number), etc. Those words on the cover are not intended to be limiting to the tray insert or the present application.

It should also be noted that the 3D appearance/shape of the tray insert shown in FIG. 1 is not intended to be exclusive or be limiting to the tray inserts disclose din this application. Basically, the tray inserts may have any other available 3D appearance/shape as long as that appearance/shape may help to realize the function of the tray inserts disclosed in this application.

The present application discloses additional 15 tray inserts (see FIGS. 2A to 16B) in 15 embodiments (each corresponding to one embodiment). The following Table 1 generally lists some OEM information regarding each tray insert in these 15 embodiments for illustration only.

TABLE 1

Table of the VIQ Certification Tray Phantom Set
Kit Part Number: 2000502-10

| Phantom No. | Phantom | Equipment Used On | Part Number | Description | Measured Parameter |
|---|---|---|---|---|---|
| 1 | Effective and Dual Energy Phantom | CT-EDS Only | 2000503-10 | High purity test object inserts in a variety of six (6) different materials. | Effective energy, material specific effective atomic number (for dual energy platforms), attenuation or CT number. |
| 2 | | CT-EDS Only | 2000503-30 | | |
| 3 | | AT - L.S. Source, Smiths or Rapiscan | 2000503-50 | | |
| 4 | | AT - R.S. Source, Rapiscan Only | 2000503-70 | | |
| 5 | | AT - Lower Source, Smiths Only | 2000503-90 | | |
| 6 | | AT - L.S. Lower Source, Rapiscan Only | 2000503-110 | | |
| 7 | | AT - R.S. Lower Source, Rapiscan Only | 2000503-130 | | |
| 8 | | CT-EDS Only | 2000504-10 | Cylinder for measuring CT number consistency and a rectangular bar for measuring SSP | Mean CT number and standard deviation for the cylinder reference object Resolution of the image along the direction of belt movement |
| 9 | Modulation Transfer Function (MTF) Phantom A | AT - Center Lower Source, Smiths Only | 2000505-10 | Metal test object for measuring MTF | Resolution of the image within the X and Y planes. |
| 10 | | AT - L.S. Lower Source, Rapiscan Only | 2000505-30 | | |
| 11 | Phantom B | AT - R.S. Lower Source, Rapiscan Only | 2000505-50 | | |
| 12 | Sheet on Belt Phantom | CT-EDS Only | 2000506-10 | Plastic test object sheet | Evaluates the efficacy of sheet detection performance |
| 13 | Wire Resolution Phantom | CT-EDS Only | 2000507-10 | Different gauge wire/metal step cylinder | Provides onscreen wire resolution (e.g., wire resolution; which is a CT adaptation of the ASTM792 Useful Penetration Test) |
| 14 | Stability Phantom A | CT-EDS Only | 2000508-10 | explosive simulants covering broad density/Z effective range. | Provides assessment of tray impact on key CT metrics associated with detection within the explosive threat region. |
| 15 | Stability Phantom B | | 2000508-30 | | |

Table 1 describes fifteen (15) tray inserts which comprise the tray certification test set for both cabin baggage and hold baggage screening applications. Eight (8) tray inserts (Phantom No. 3-7, 9-11) are dedicated to 2D X-ray systems, and seven (7) (Phantom No. 1-2, 8, 12-15) are for use on X-ray CT screening technologies. The mapping between the systems and the tray insert (e.g., phantom) types are shown in the following Table 2.

TABLE 2

| System | Phantom Type | Measured Parameter |
| --- | --- | --- |
| CT/2D | Effective and Dual Energy | Effective energy, effective atomic number (for dual-energy EDS), linear attenuation or CT number. |
| CT | Slice Sensitivity Profile and CTN Consistency | Measures contrast as a function of spatial resolution for both the X, Y, and Z planes. Measurement of the average CT number for a reference object and variance of CT values within the reference object. |
| 2D | Modulation Transfer Function (MTF) A, B, and C | Measures contrast as a function of spatial resolution for the X, Y, and Z planes. Phantoms can support orthogonal and angled X-ray sources. |
| CT | Sheet on Belt | Evaluates the efficacy of sheet detection performance |
| CT | Wire Resolution | Provides onscreen wire resolution which is a CT adaptation of the European Standard Test Piece (STP) |
| CT | Stability A\B | Uses 5 explosive simulants for assessment of tray impact on key CT metrics associated with explosives detection. |

The tray inserts listed in the above Table 1 and Table 2 will further described below with reference to FIG. 2A-16B. The information related to each tray insert may be referred to corresponding items in the above Table 1 and Table 2.

Figure 2A:
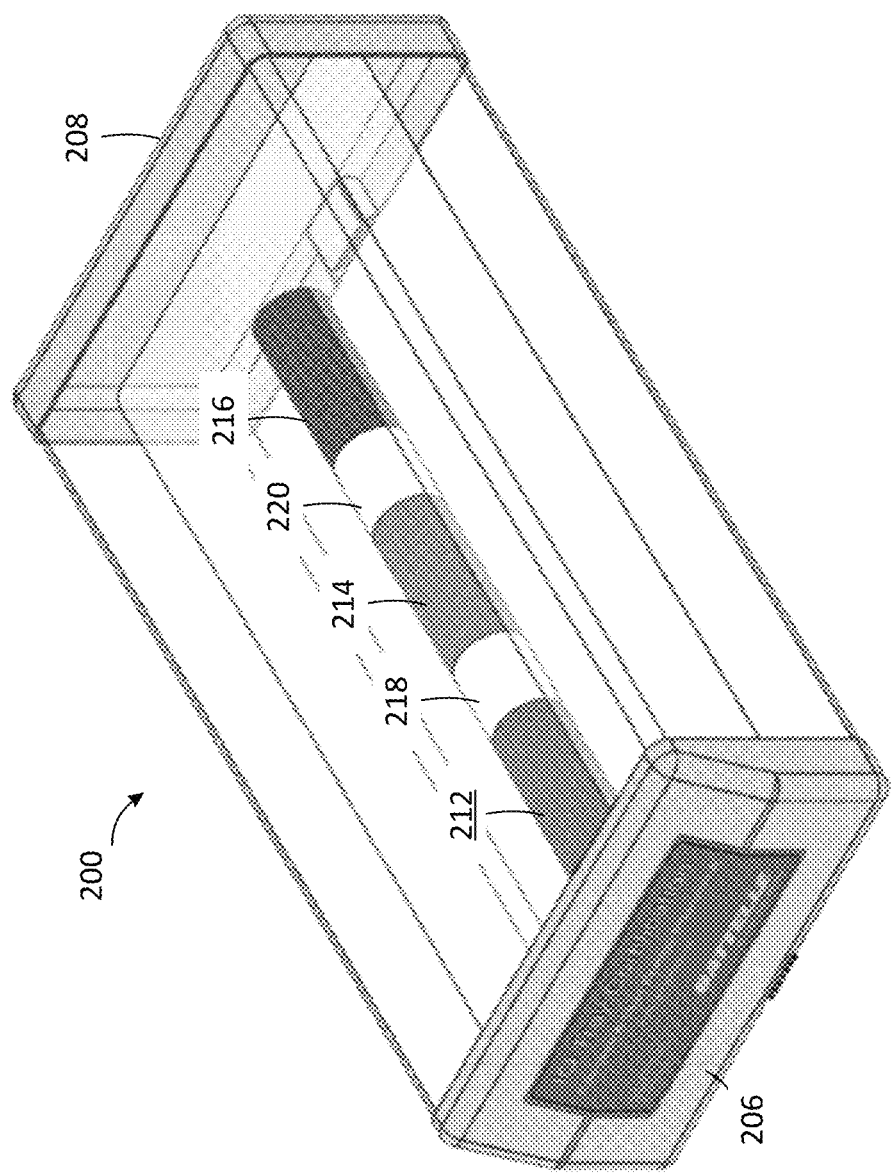
FIG. 2A is a perspective and assembled view illustrating a tray insert according to the second embodiment of this application.
Figure 2B:
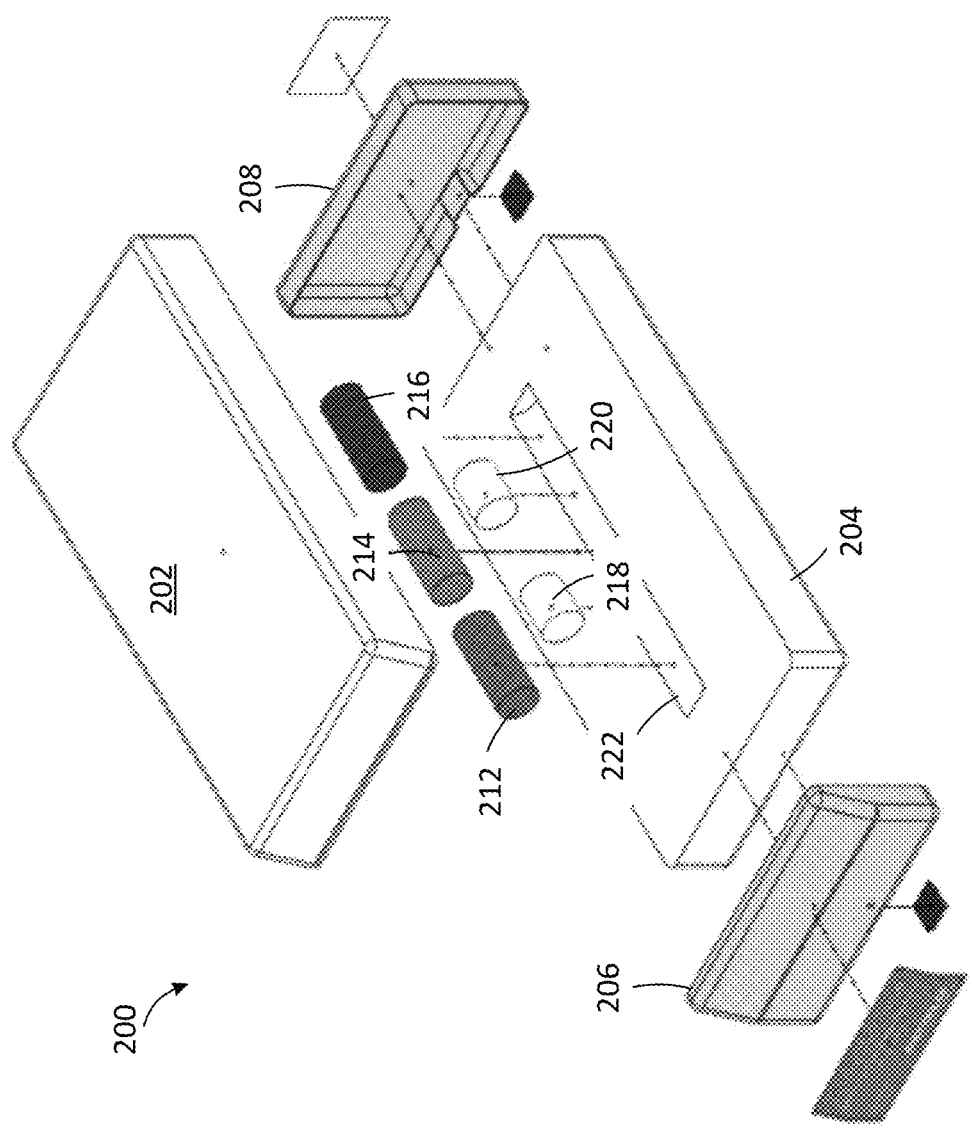
FIG. 2B is an exploded view illustrating the tray insert shown in the FIG. 2A.

FIGS. 2A and 2B illustrate a tray insert according to the second embodiment of this application. FIG. 2A is a perspective and assembled view illustrating the tray insert 200 and FIG. 2B is an exploded view illustrating the tray insert shown in the FIG. 2A. This tray insert 200 is an Effective and Dual Energy tray insert corresponding to the phantom No. 1 in Table 1. The tray insert 200 may comprise at least the following components (from left-hand side to right hand side): a silicone part 212, an aluminum part 214, a graphite part 216 and two foam plugs 218, 220. As shown in FIG. 2A, the silicone part 212, the aluminum part 214 and the graphite part 216 may be shown in grayscale colors, while the foam plugs may be shown in white color separating the adjacent parts (212, 214 and 218). These components may be cylinders or have an approximately cylinder-like appearance. Accordingly, in the body 204 of the tray insert 200 there may be groove(s) 222 to accommodate the above-discussed parts. These components may be used to evaluate the metrics discussed above. It should be noted that the sequence of the silicone part 212, the aluminum part 214 and the graphite part 216 may vary in different sequential orders and different variants of the tray insert in this embodiment.

Figure 3A:
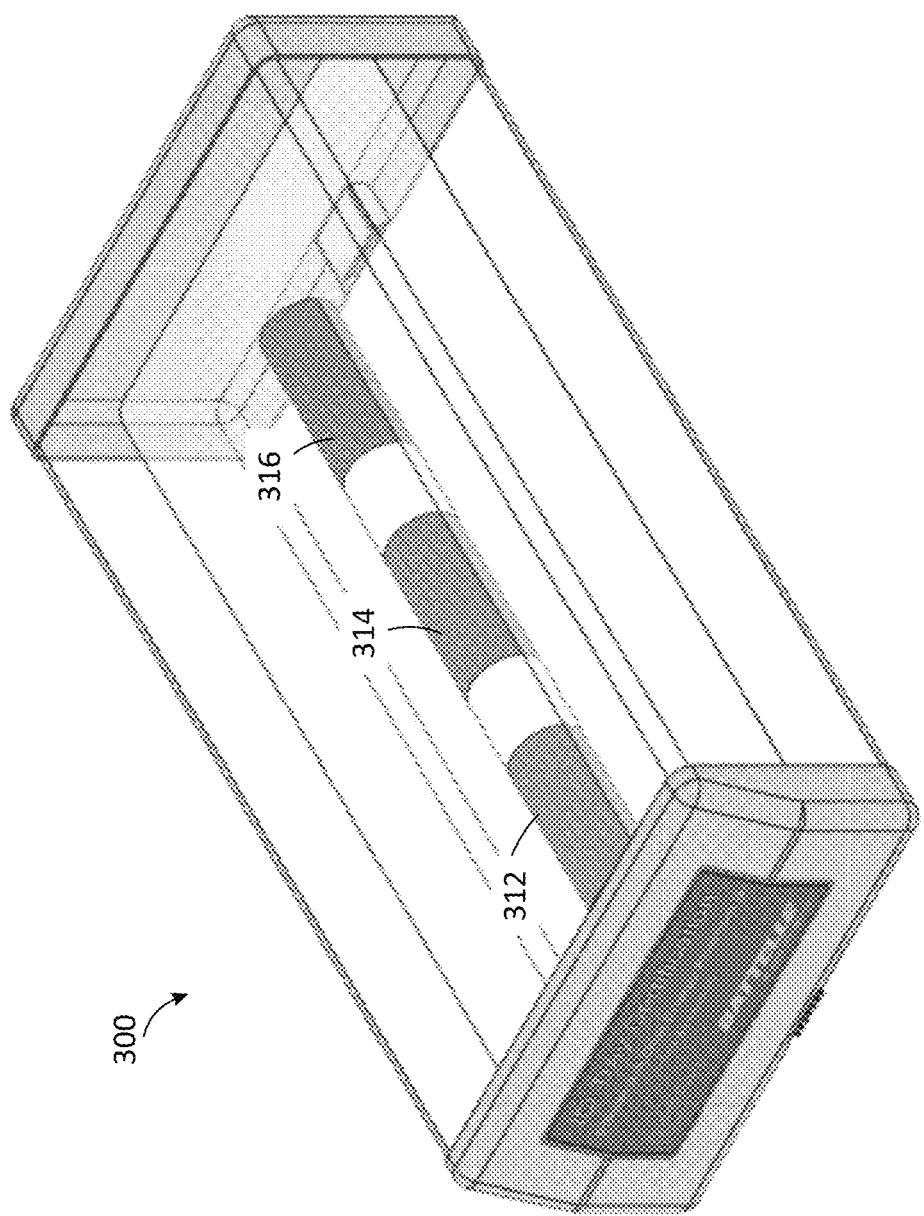
FIG. 3A is a perspective and assembled view illustrating a tray insert according to the third embodiment of this application.
Figure 3B:
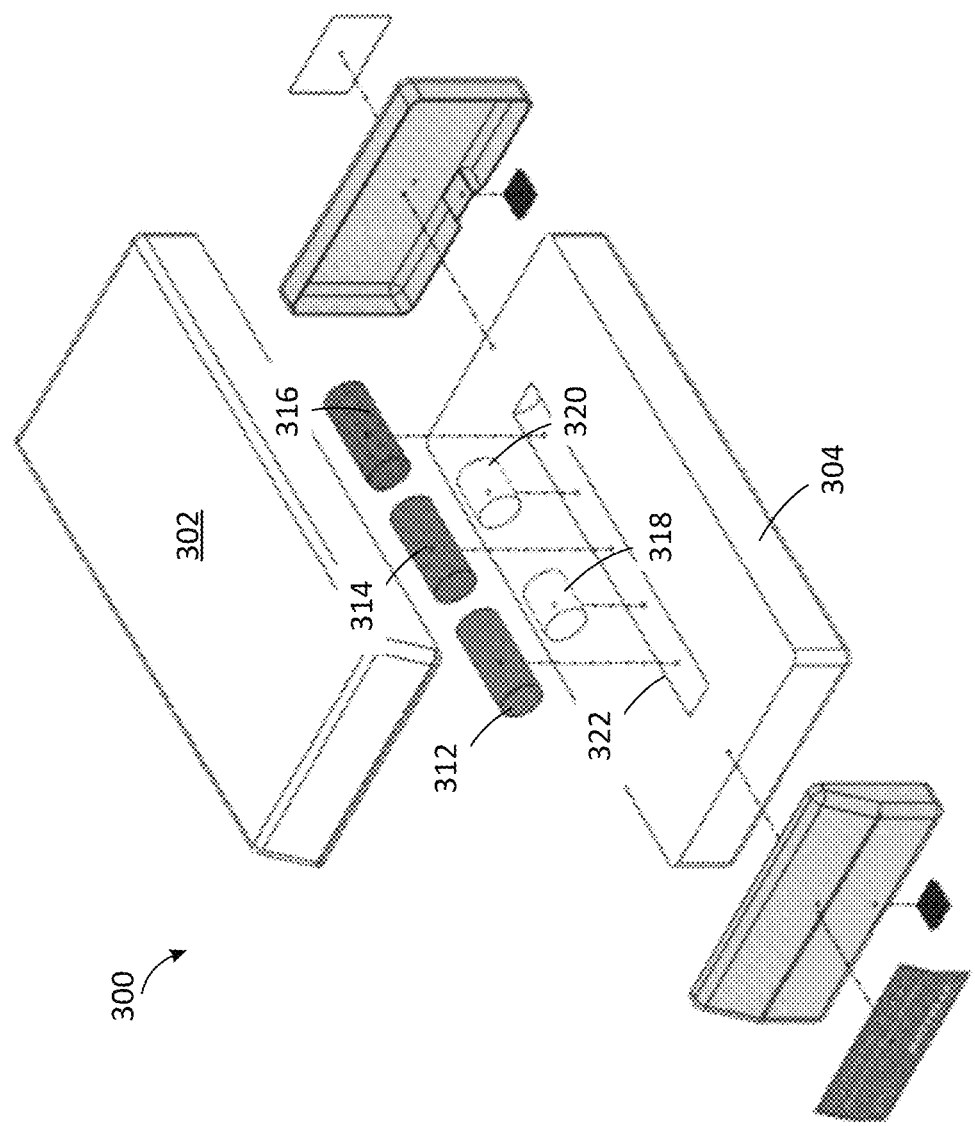
FIG. 3B is an exploded view illustrating the tray insert shown in the FIG. 3A.

FIGS. 3A and 3B illustrate a tray insert 300 according to the third embodiment of this application. FIG. 3A is a perspective and assembled view illustrating the tray insert and FIG. 3B is an exploded view illustrating the tray insert 300 shown in the FIG. 3A. This tray insert 300 is an Effective and Dual Energy tray insert corresponding to the phantom No. 2 in Table 1. The tray insert 300 may include at least the following components (from left-hand side to right hand side): a Teflon part 312, a magnesium part 314, an acetal part 316 and two foam plugs 318, 320. As shown in FIG. 3A, the Teflon part 312, the magnesium part 314 and the acetal part 316 may be shown in grayscale colors, while the foam plugs 318, 320 may be shown in white color. These components may be cylinders or have an approximately cylinder-like appearance. Accordingly, there may be groove(s) 322 in the body of the tray insert 300 to accommodate the above-discussed parts. These components may be used to evaluate the metrics discussed above. It should be noted that the sequence of the Teflon part 312, the magnesium part 314 and the acetal part 316 may vary in different sequential orders and in different variants of the tray insert in this embodiment.

Figure 4B:
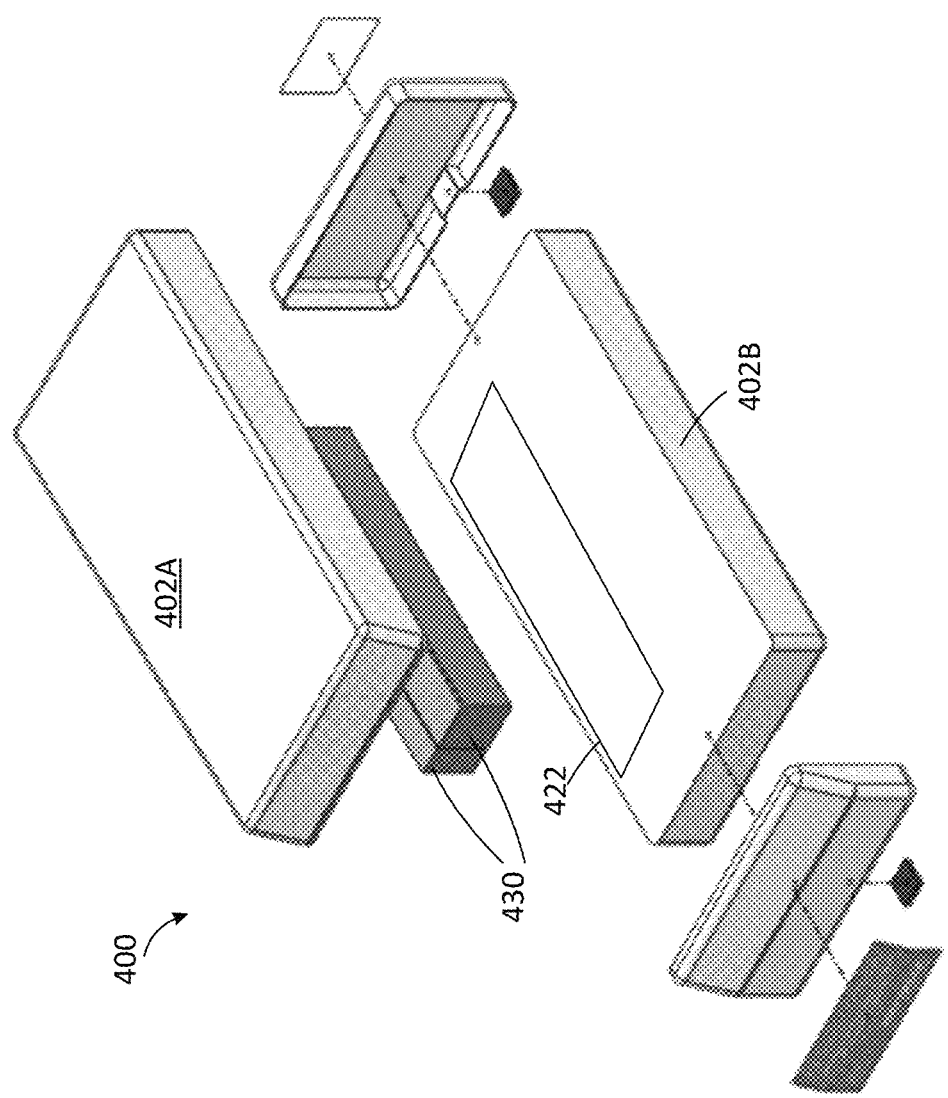
FIG. 4B is an exploded view illustrating the tray insert shown in the FIG. 4A.

FIGS. 4A and 4B illustrate a tray insert 400 according to the fourth embodiment of this application. FIG. 4A is a perspective and assembled view illustrating the tray insert and FIG. 4B is an exploded view illustrating the tray insert 400 shown in the FIG. 4A. This tray insert 400 is an Effective and Dual Energy tray insert corresponding to the phantom No. 3 in Table 1. The tray insert 400 may comprise at least the following component: a module assembly 430 which is close to or attached to the left-hand side wall 401A of the tray insert body 400. This module assembly may be a cube or have an approximately cube-like appearance. Accordingly, there may be groove(s) 422 in the body 402 of the tray insert 400 to accommodate the module assembly. As shown in FIGS. 4A and 4B, this module 430 assembly may include two parts 430A, 430B attached to each other. In a variant of this embodiment, the module assembly 430 may include more than two parts 430A, 430B which have been attached to each other in sequence. The module assembly 430 may be used to evaluate the metrics discussed above. The material of the module assembly 430 may be made from at least one of the following material: silicone, aluminum, graphite, Teflon, magnesium, acetal, foam, etc. It should be noted that the sequence of the Teflon part, the magnesium part and the acetal part may vary in different variants of the tray insert in this embodiment.

Figure 5A:
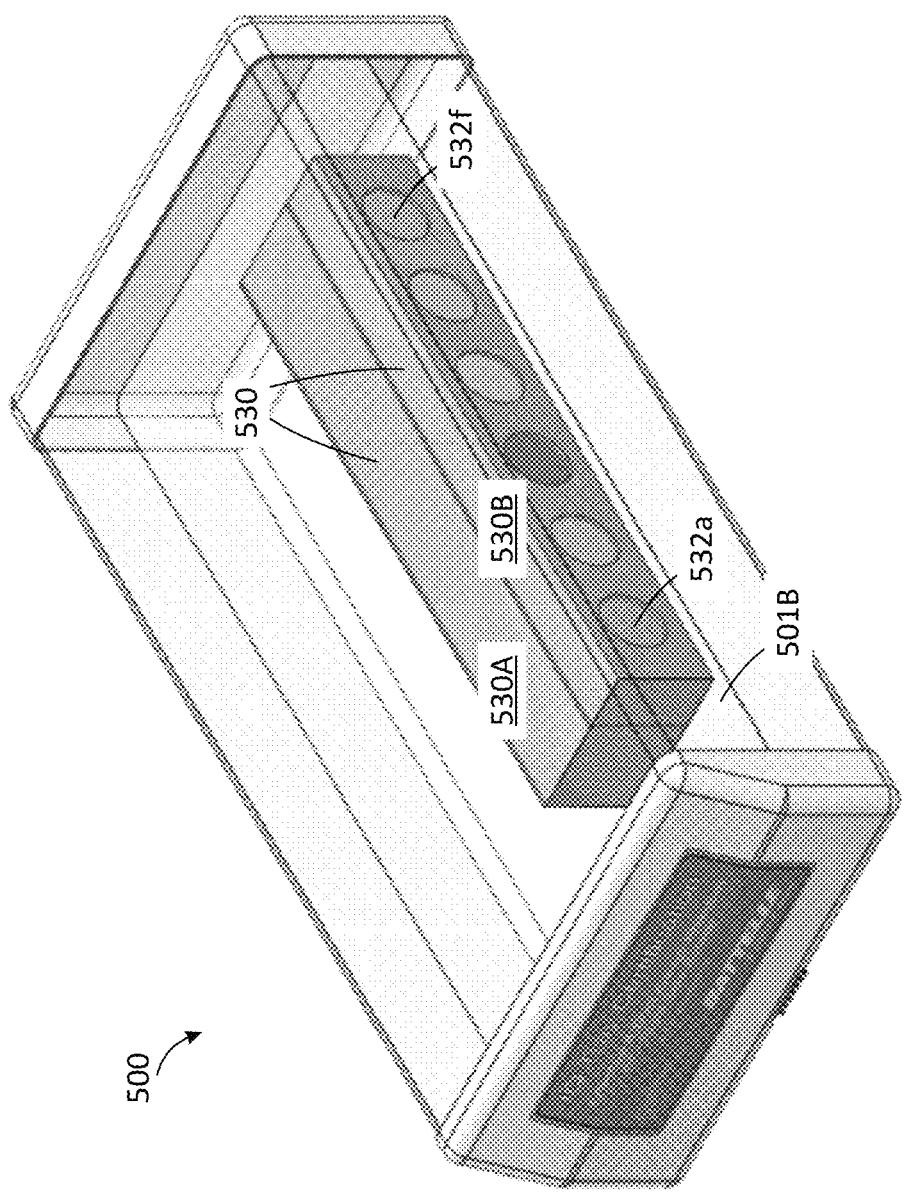
FIG. 5A is a perspective and assembled view illustrating a tray insert according to the fifth embodiment of this application.
Figure 5B:
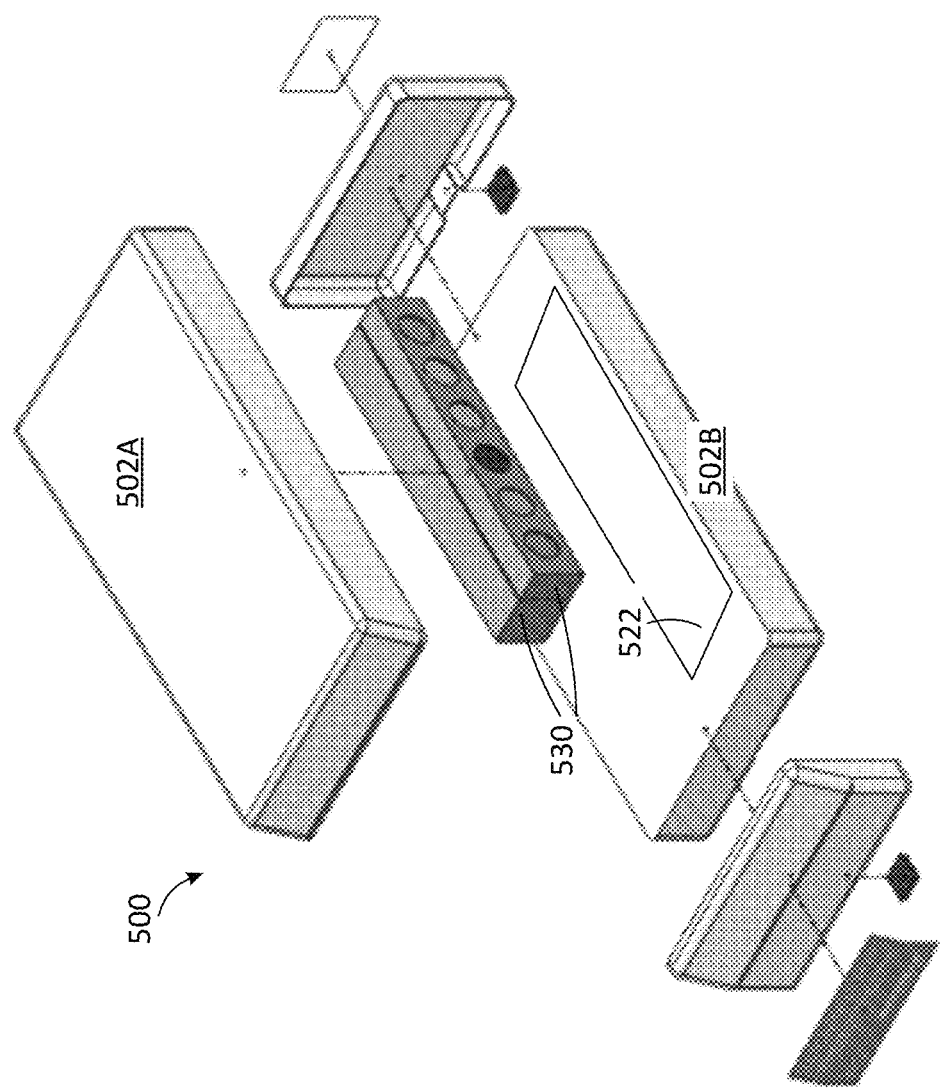
FIG. 5B is an exploded view illustrating the tray insert shown in the FIG. 5A.

FIGS. 5A and 5B illustrate a tray insert 500 according to the fifth embodiment of this application. FIG. 5A is a perspective and assembled view illustrating the tray insert 500 and FIG. 5B is an exploded view illustrating the tray insert 500 shown in the FIG. 5A. This tray insert 500 is an Effective and Dual Energy tray insert corresponding to the phantom No. 4 in Table 1. A difference between this tray insert 500 and that 400 shown in FIGS. 4A and 4B is that in this tray insert, the module assembly 530 is closed to (proximal to) or attached to the right-hand side 501B wall of the tray insert body 502. Accordingly, there may be groove(s) 522 in the body 502 of the tray insert to accommodate the module assembly 530. Also, as shown in FIGS. 5A and 5B, one part of the module assembly 530 comprises multiple holes 532a-532f shown in grayscale colors. Different materials may be filled into those holes 532a-532f respectively, and the materials may be selected from the following: silicone, aluminum, graphite, Teflon, magnesium, acetal, foam, etc. It should be noted that although there are six holes shown in this embodiment, they are not intended to be exclusive or be limiting to the tray insert. In a variant of this embodiment, there may more than six holes 532a-532f or less than six holes in the module assembly 530.

Figure 6A:
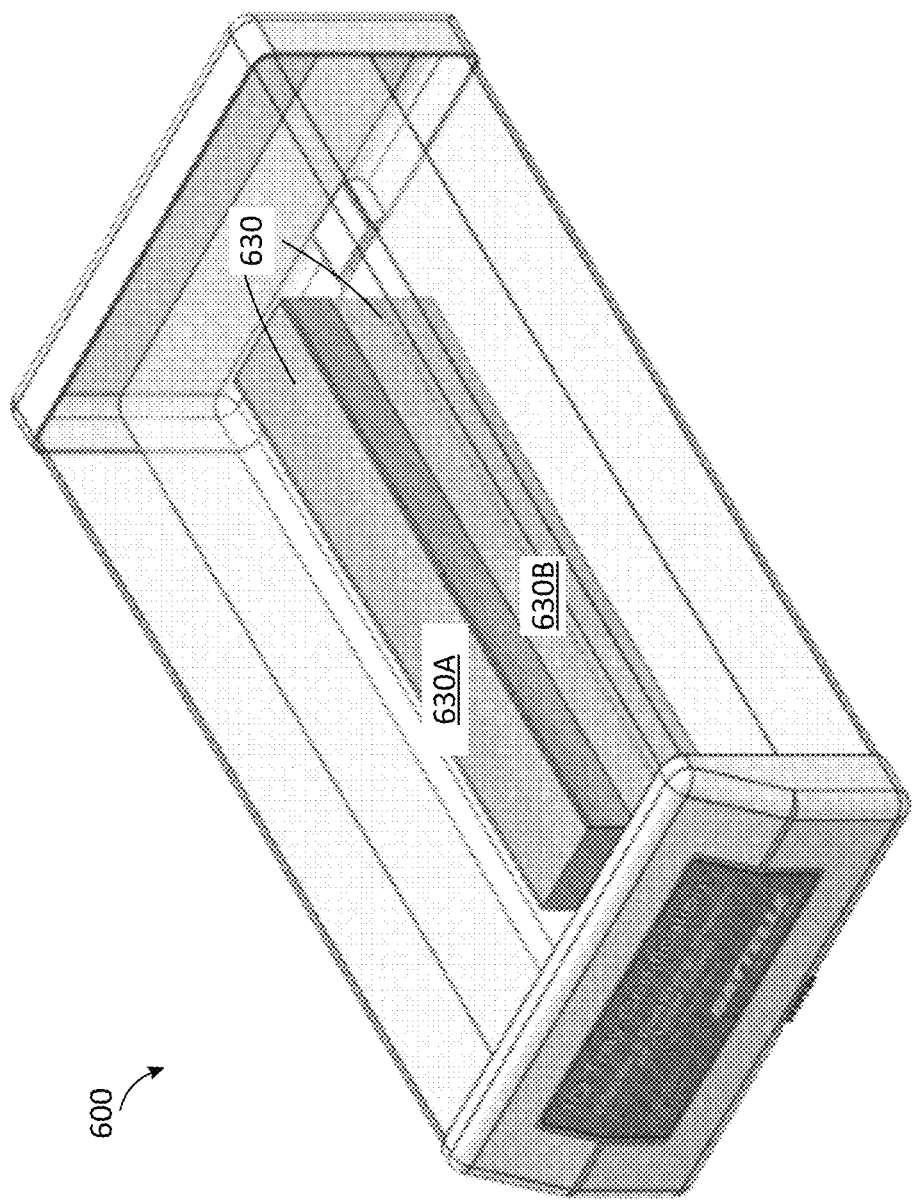
FIG. 6A is a perspective and assembled view illustrating a tray insert according to the sixth embodiment of this application.
Figure 6B:
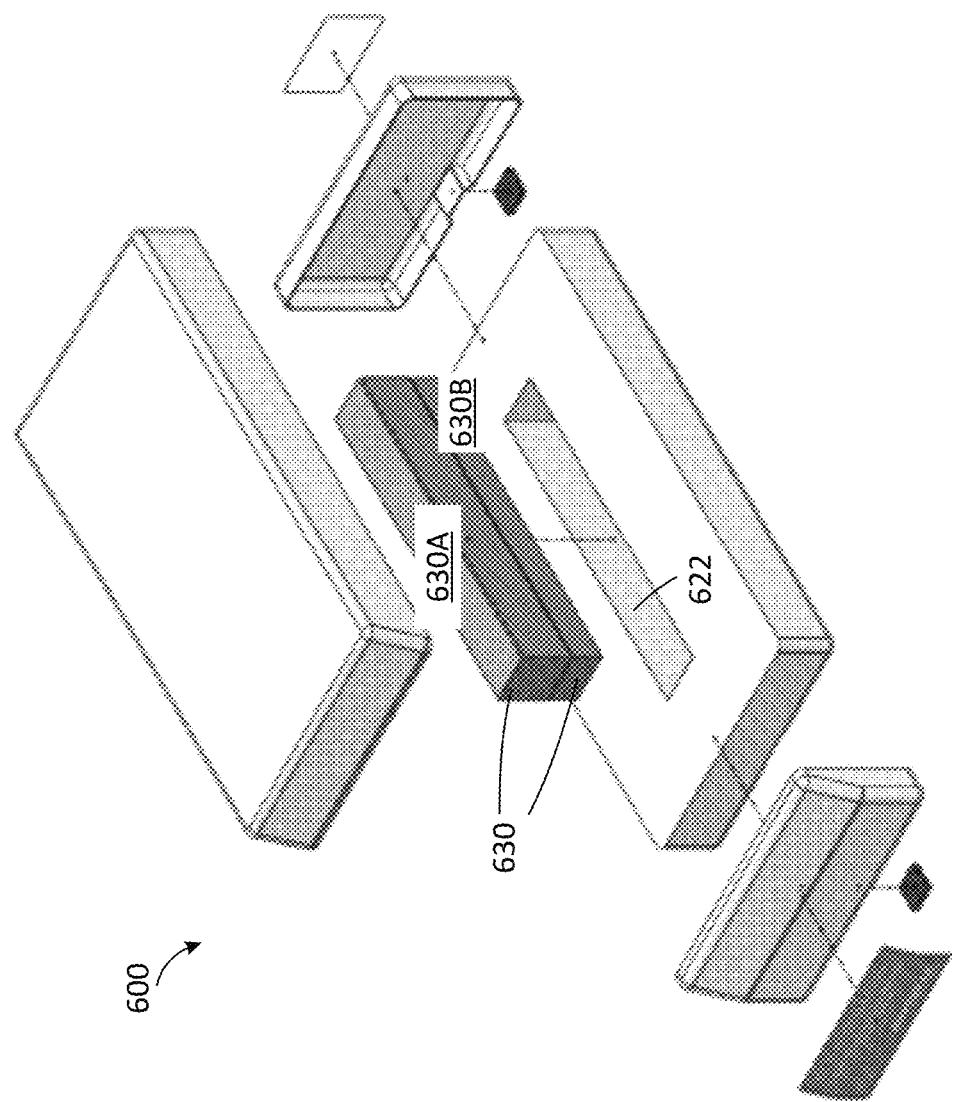
FIG. 6B is an exploded view illustrating the tray insert shown in the FIG. 6A.

FIGS. 6A and 6B illustrate a tray insert according to the sixth embodiment of this application. FIG. 6A is a perspective and assembled view illustrating the tray insert and FIG. 6B is an exploded view illustrating the tray insert shown in the FIG. 6A. This tray insert 600 is an Effective and Dual Energy tray insert corresponding to the phantom No. 5 in Table 1. A difference between this tray insert 600 and that shown 400 in FIGS. 4A and 4B is that in this tray insert 600, the module assembly 630 is close to (proximal to) or located at the bottom center 640 of the tray insert body 602B. The module assembly 630 may also comprise multiple holes (not shown) as those shown in the fifth embodiment above. Materials in the holes may be referred to those materials disclosed in the fifth embodiment above.

Figure 7A:
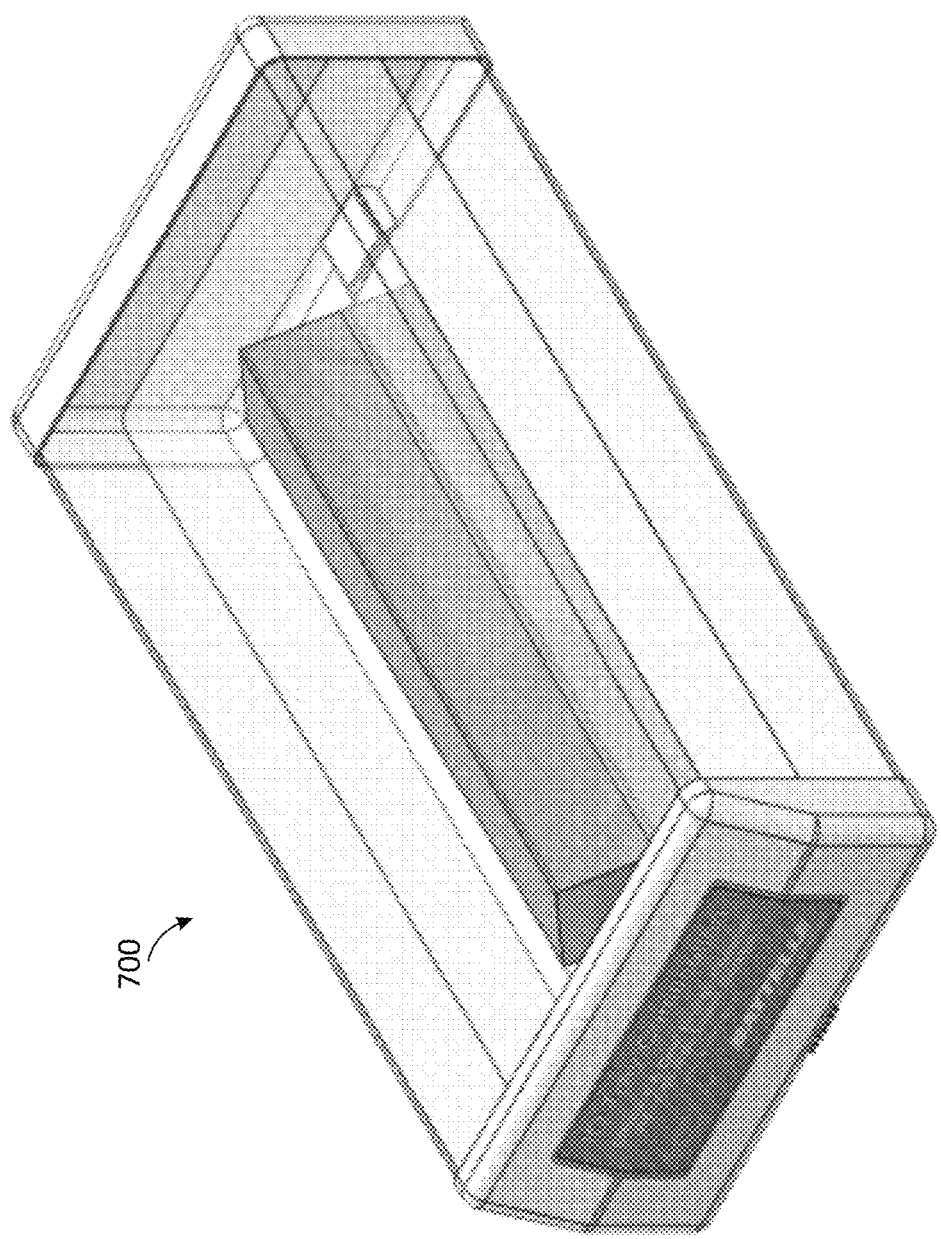
FIG. 7A is a perspective and assembled view illustrating a tray insert according to the seventh embodiment of this application.
Figure 7B:
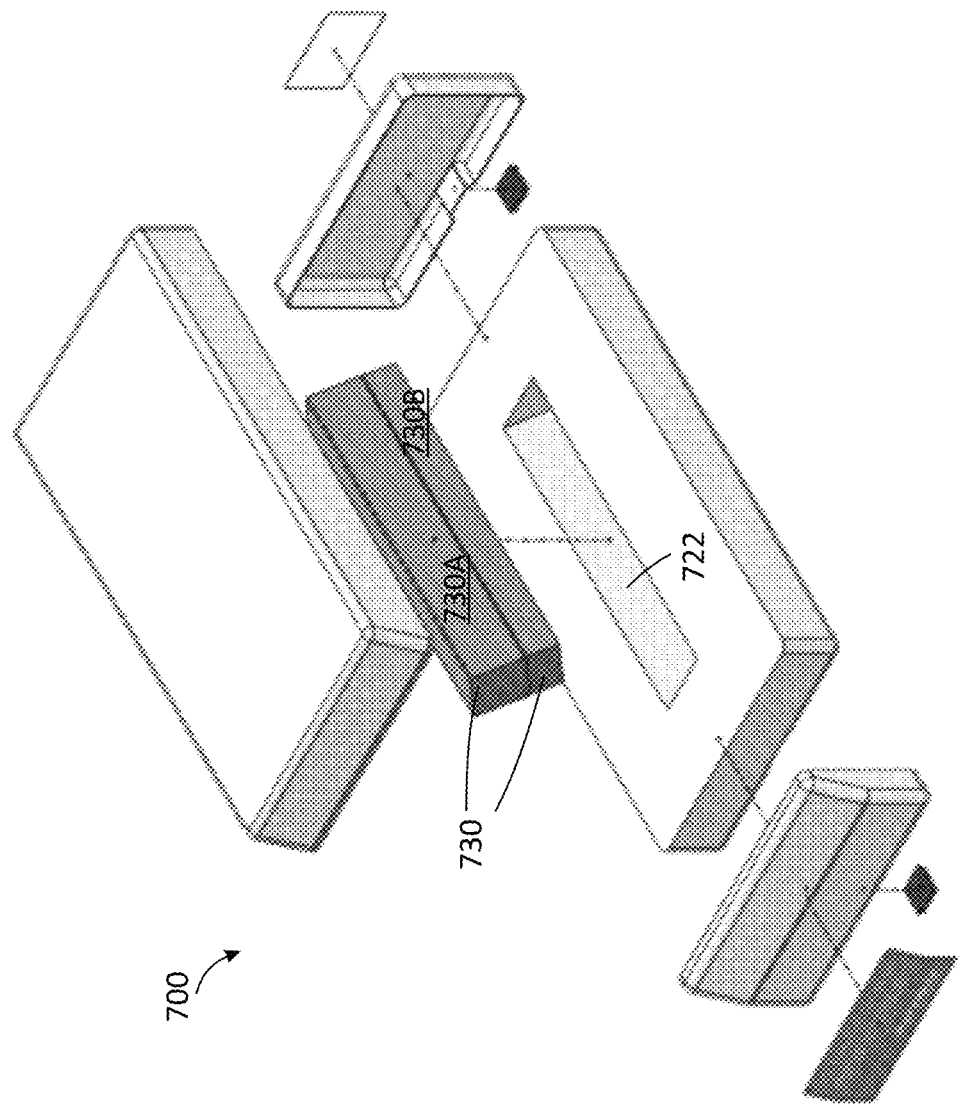
FIG. 7B is an exploded view illustrating the tray insert shown in the FIG. 7A.

FIGS. 7A and 7B illustrate a tray insert 700 according to the seventh embodiment of this application. FIG. 7A is a perspective and assembled view illustrating the tray insert 700 and FIG. 7B is an exploded view illustrating the tray insert shown in the FIG. 7A. This tray insert 700 is an Effective and Dual Energy tray insert corresponding to the phantom No. 6 in Table 1. A difference between this tray insert 700 and 600 that shown in FIGS. 6A and 6B is that in this tray insert 700, the module assembly 730 tilts at an angle to the left-hand side of the tray insert. The module assembly may also comprise two parts 730A, 730B as those shown in the fifth embodiment. The module assembly 730 may also comprise multiple holes (not shown) as those shown in the fifth embodiment above. Materials in the holes may be referred to those materials disclosed in the fifth embodiment above.

Figure 8A:
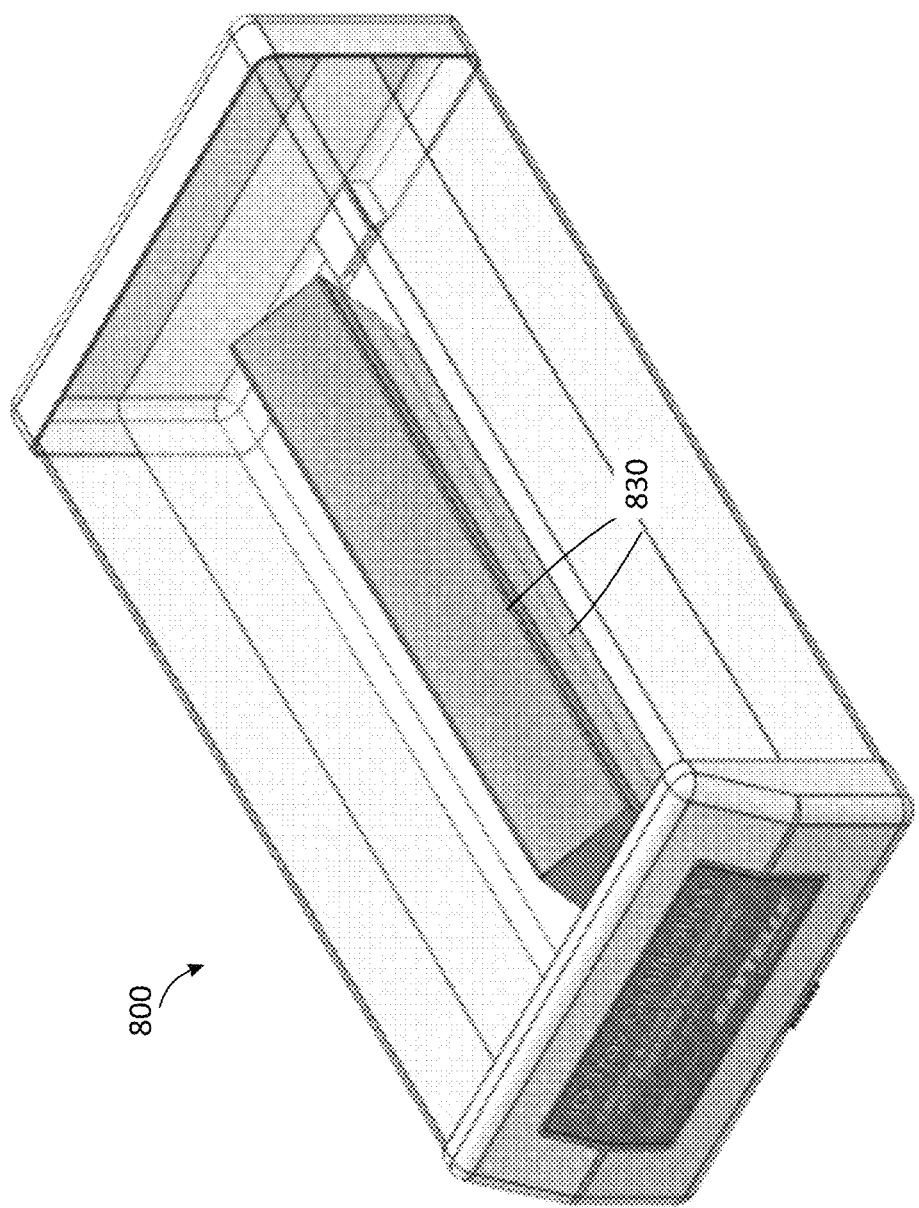
FIG. 8A is a perspective and assembled view illustrating a tray insert according to the eighth embodiment of this application.
Figure 8B:
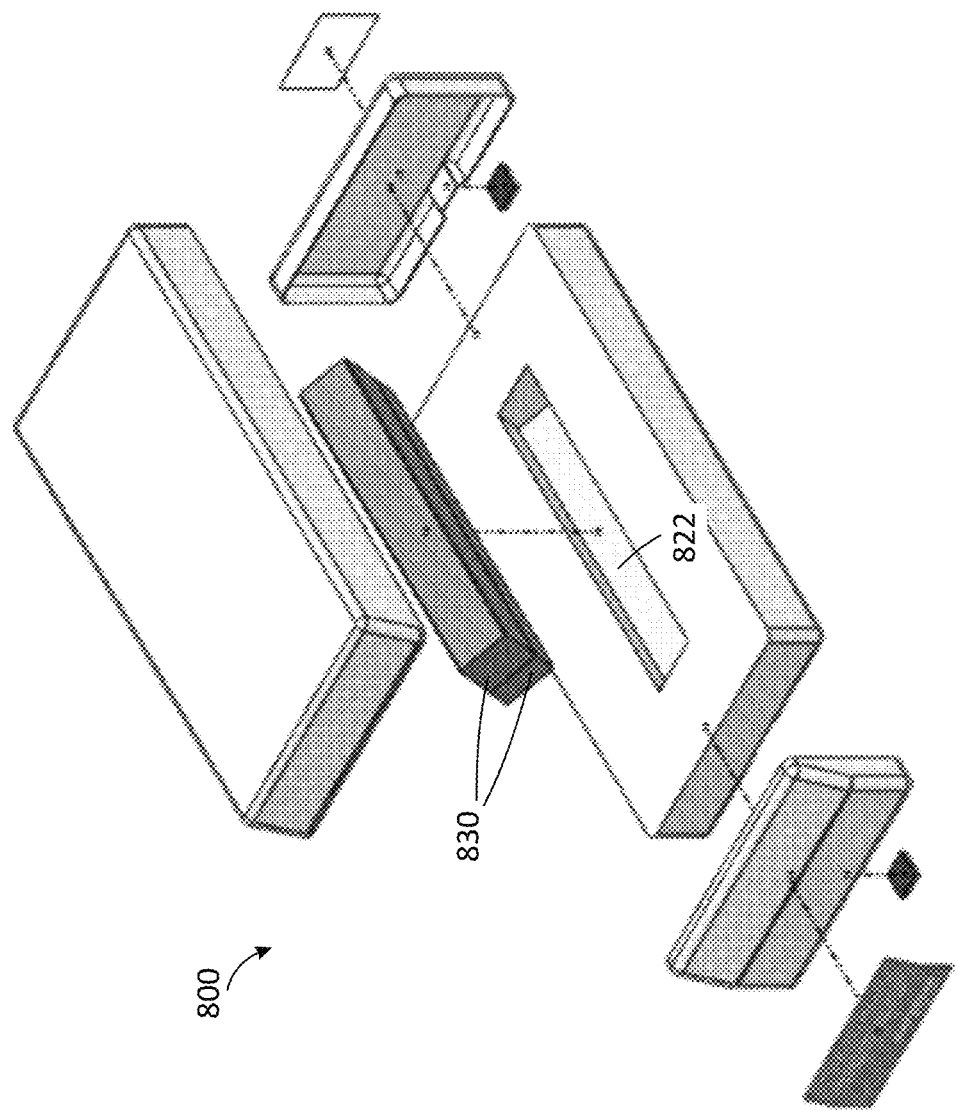
FIG. 8B is an exploded view illustrating the tray insert shown in the FIG. 8A.

FIGS. 8A and 8B illustrate a tray insert 800 according to the eighth embodiment of this application. FIG. 8A is a perspective and assembled view illustrating the tray insert 800 and FIG. 8B is an exploded view illustrating the tray insert shown in the FIG. 8A. This tray insert 800 is an Effective and Dual Energy tray insert corresponding to the phantom No. 7 in Table 1. A difference between this tray insert 800 and 700 that shown in FIGS. 7A and 7B is that in this tray insert 800, the module assembly 830 tilts at an angle to the right-hand side of the tray insert.

Figure 9A:
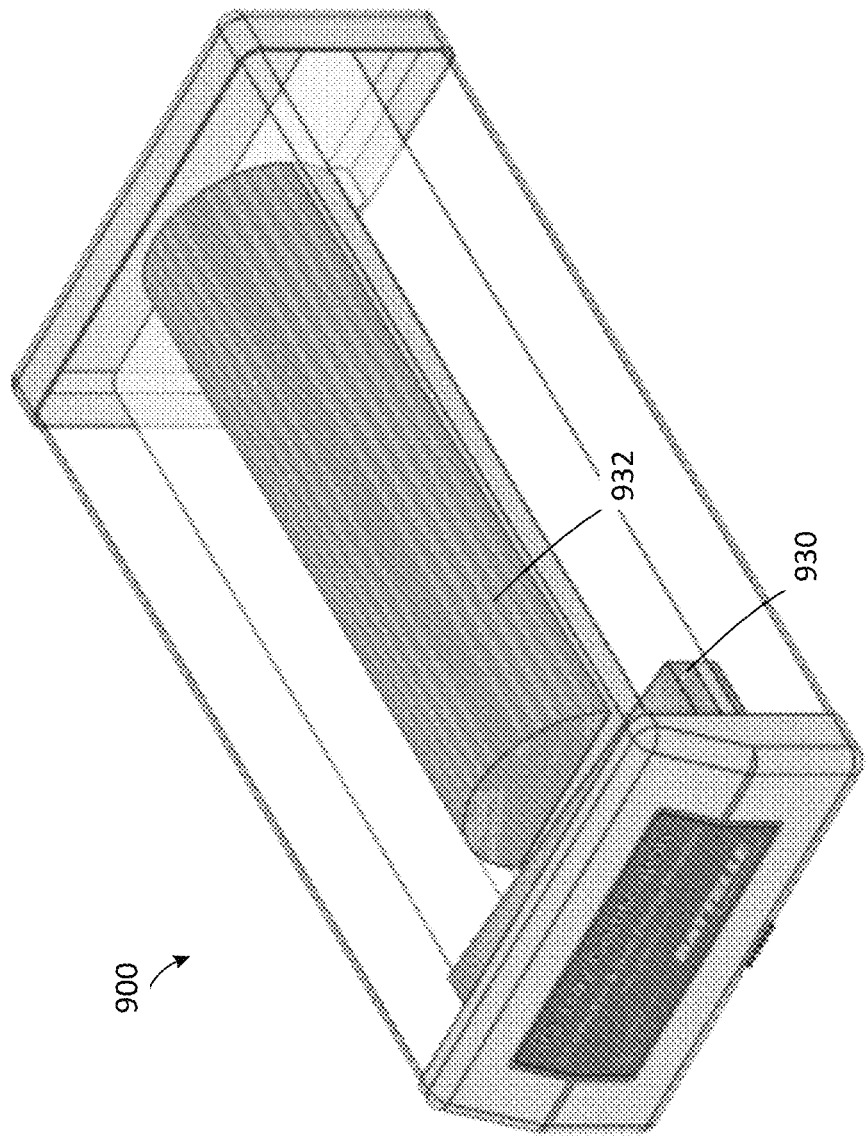
FIG. 9A is a perspective and assembled view illustrating a tray insert according to the ninth embodiment of this application.
Figure 9B:
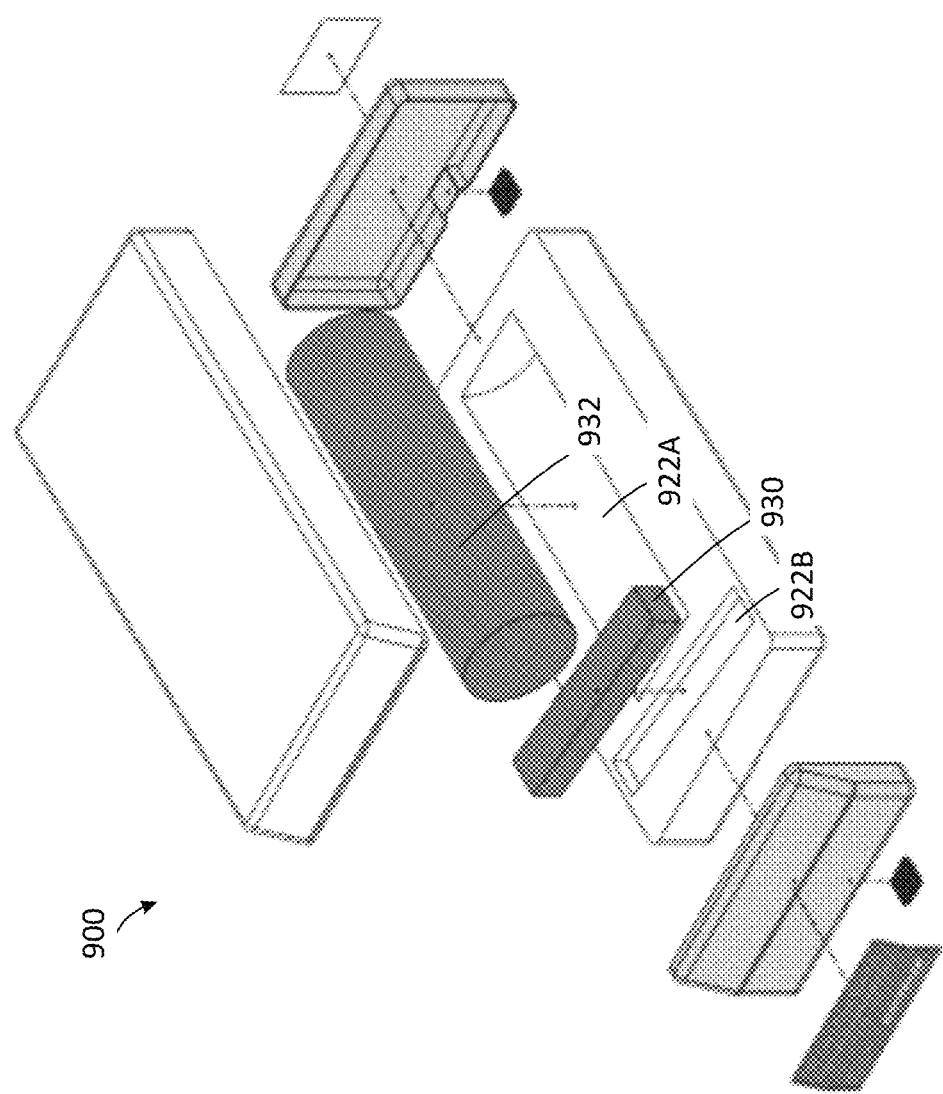
FIG. 9B is an exploded view illustrating the tray insert shown in the FIG. 9A.

FIGS. 9A and 9B illustrate a tray insert according to the ninth embodiment of this application. FIG. 9A is a perspective and assembled view illustrating the tray insert and FIG. 9B is an exploded view illustrating the tray insert shown in the FIG. 9A. This tray insert 900 may be an Effective and Dual Energy tray insert corresponding to the phantom No. 8 in Table 1. The type of metrics extracted from the tray insert 900 may also be Slice Sensitivity Profile and CTN Consistency. The tray insert 900 may include at least the following components: a slice sensitivity profile (SSP) bar 930 and a CT cylinder 932. Accordingly, there may be groove(s) 922 in the lower body 902B of the tray insert 900 to accommodate the bar 930 and the cylinder 932. As shown in FIG. 9A, the SSP bar 930 and the CT cylinder 932 are perpendicular to each other. It should be noted that the positions of the SSP bar 930 and CT cylinder 932 shown in FIG. 9A are not intended to be exclusive or be limiting to the tray insert 900, and their relative positions may vary in different variants of this embodiment.

Figure 10A:
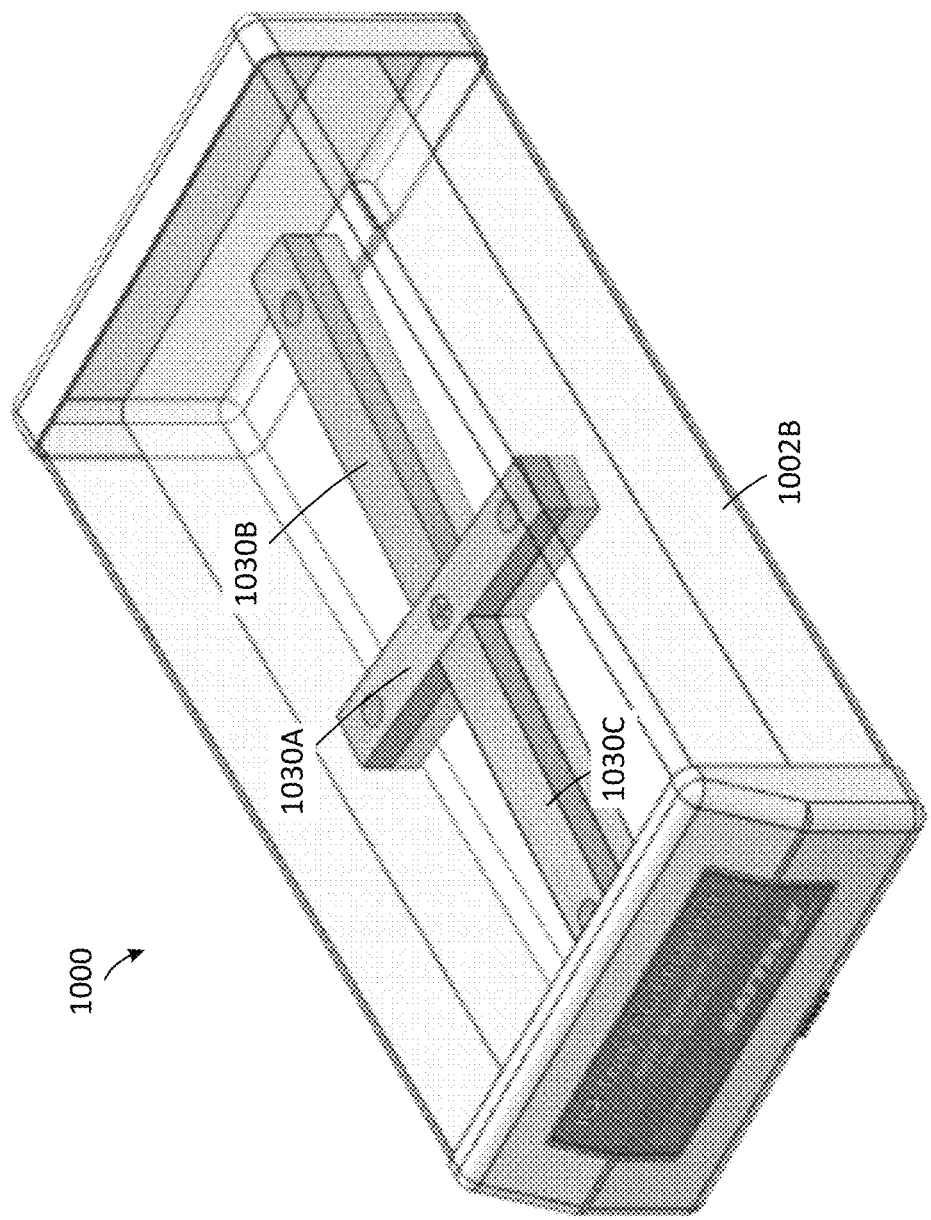
FIG. 10A is a perspective and assembled view illustrating a tray insert according to the tenth embodiment of this application.
Figure 10B:
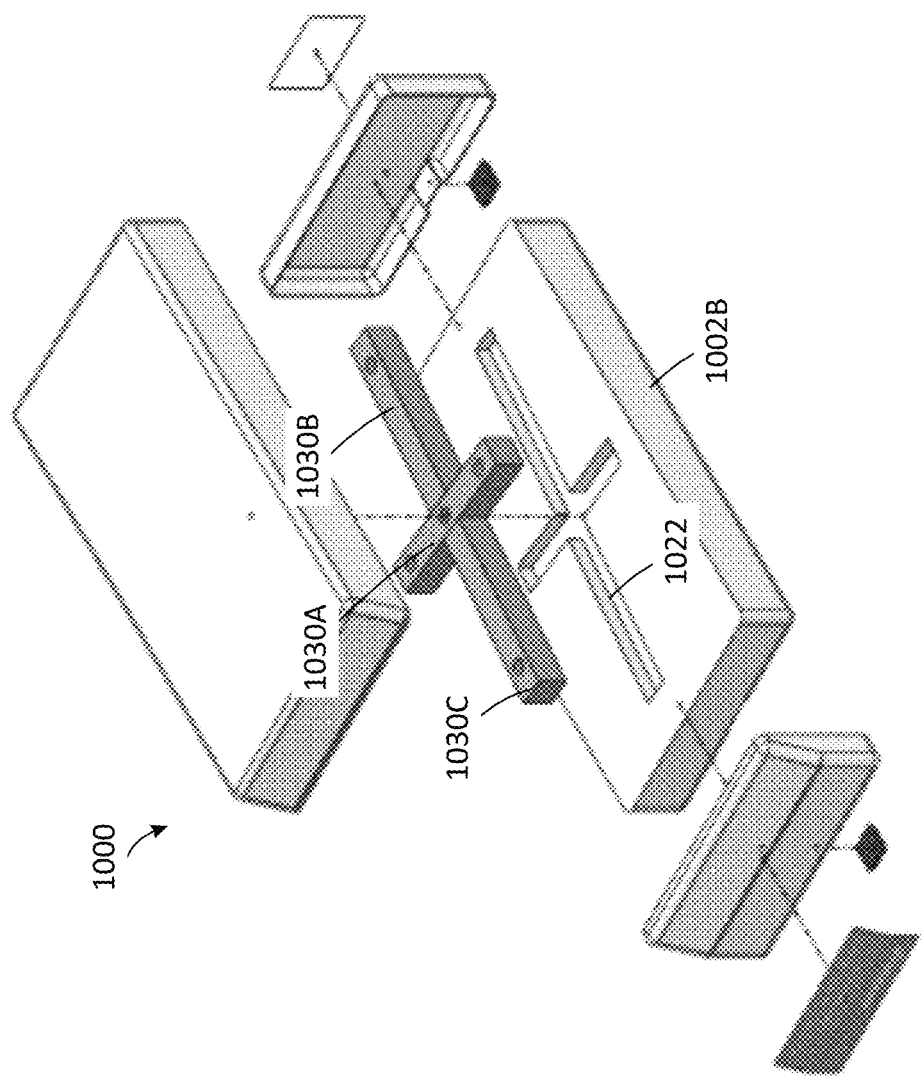
FIG. 10B is an exploded view illustrating the tray insert shown in the FIG. 10A.

FIGS. 10A and 10B illustrate a tray insert 1000 according to the tenth embodiment of this application. FIG. 10A is a perspective and assembled view illustrating the tray insert 1000 and FIG. 10B is an exploded view illustrating the tray insert 1000 shown in the FIG. 10A. This tray insert may be a Modulation Transfer Function (MTF) Phantom A corresponding to the phantom No. 9 in Table 1. The tray insert 1000 may include at least the following components: a rod assembly 1030. The rod assembly 1030 may comprise multiple rods 1030A to 1030C attached to each other. As shown in FIG. 10A, the rod assembly 1030 has a cross-like appearance or shape. It should be not noted that the appearance of the rod assembly 1030 may other appearances as long as the rod assembly 1030 may realize its function discussed in this application. The rod assembly 1030 may be allocated in the bottom 1002B of the tray insert 1000. Accordingly, there is a cross-like groove 1022 in the bottom 1002B of the tray insert to accommodate the rod assembly 1030.

Figure 11A:
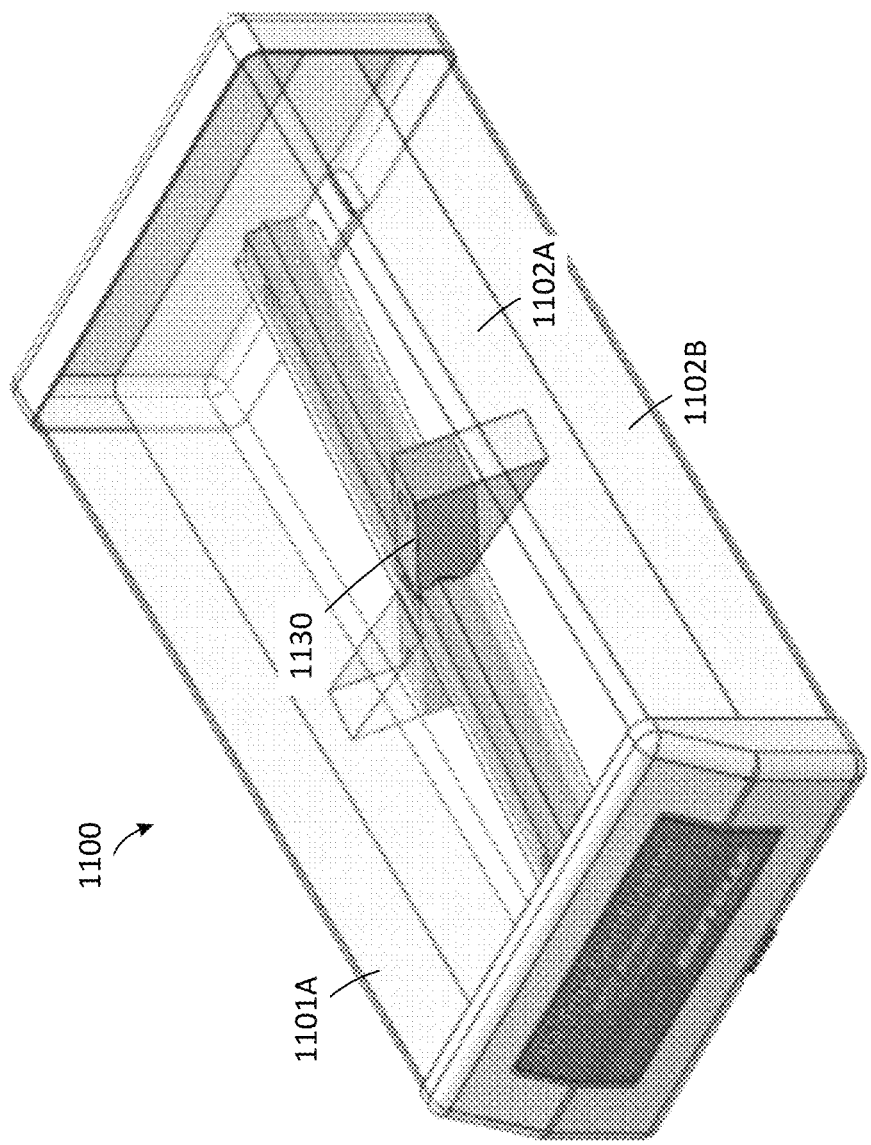
FIG. 11A is a perspective and assembled view illustrating a tray insert according to the eleventh embodiment of this application.
Figure 11B:
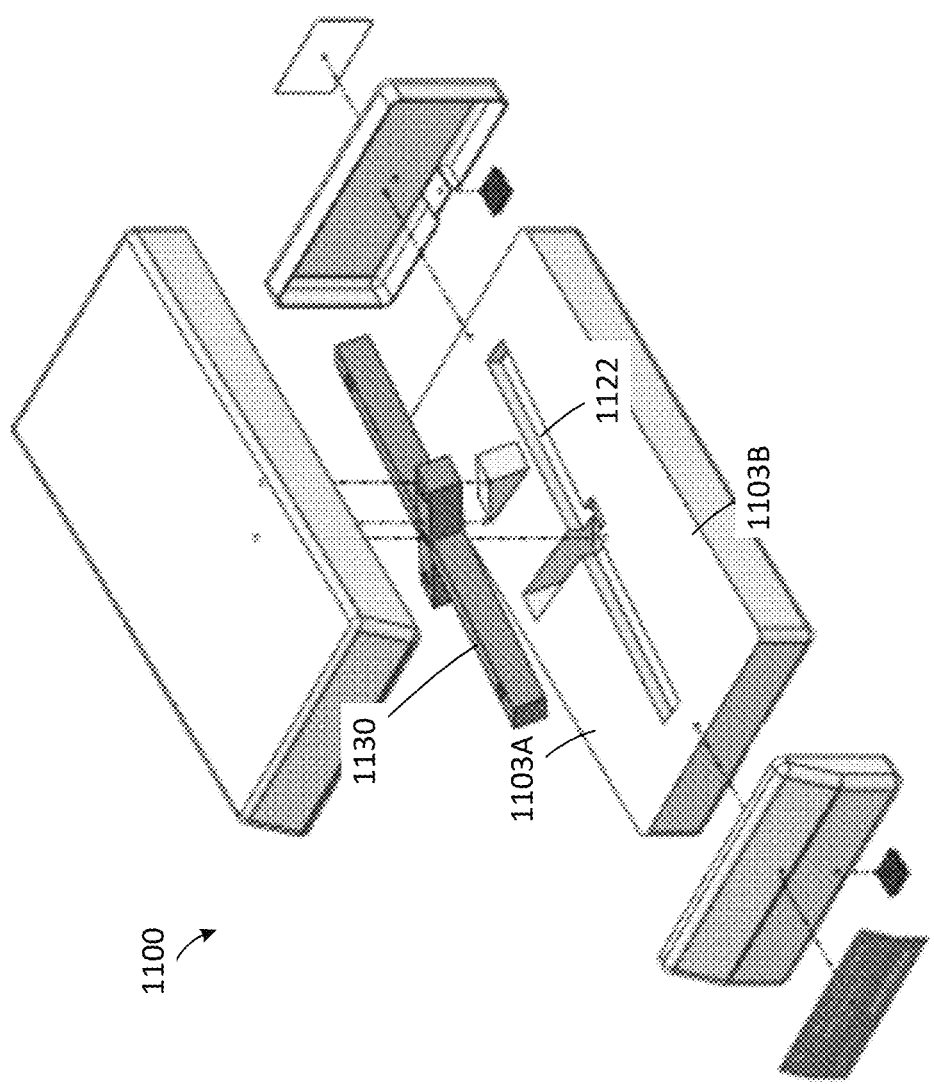
FIG. 11B is an exploded view illustrating the tray insert shown in the FIG. 11A.

FIGS. 11A and 11B illustrate a tray insert 1100 according to the eleventh embodiment of this application. FIG. 11A is a perspective and assembled view illustrating the tray insert 1100 and FIG. 11B is an exploded view illustrating the tray insert 1100 shown in the FIG. 11A. This tray insert 1100 may be a Modulation Transfer Function (MTF) Phantom B corresponding to the phantom No. 10 in Table 1. A difference between this tray insert 1100 and the one 1000 in the tenth embodiment is the rod assembly 1130 tilts to the left-hand side 1103A of the tray insert 1100. Accordingly, the groove 1122 in the bottom 1102B of the tray insert may vary to accommodate the rod assembly 1130. That is, as shown in FIG. 11B, the groove 1122 is not an exact shape of a cross.

Figure 12A:
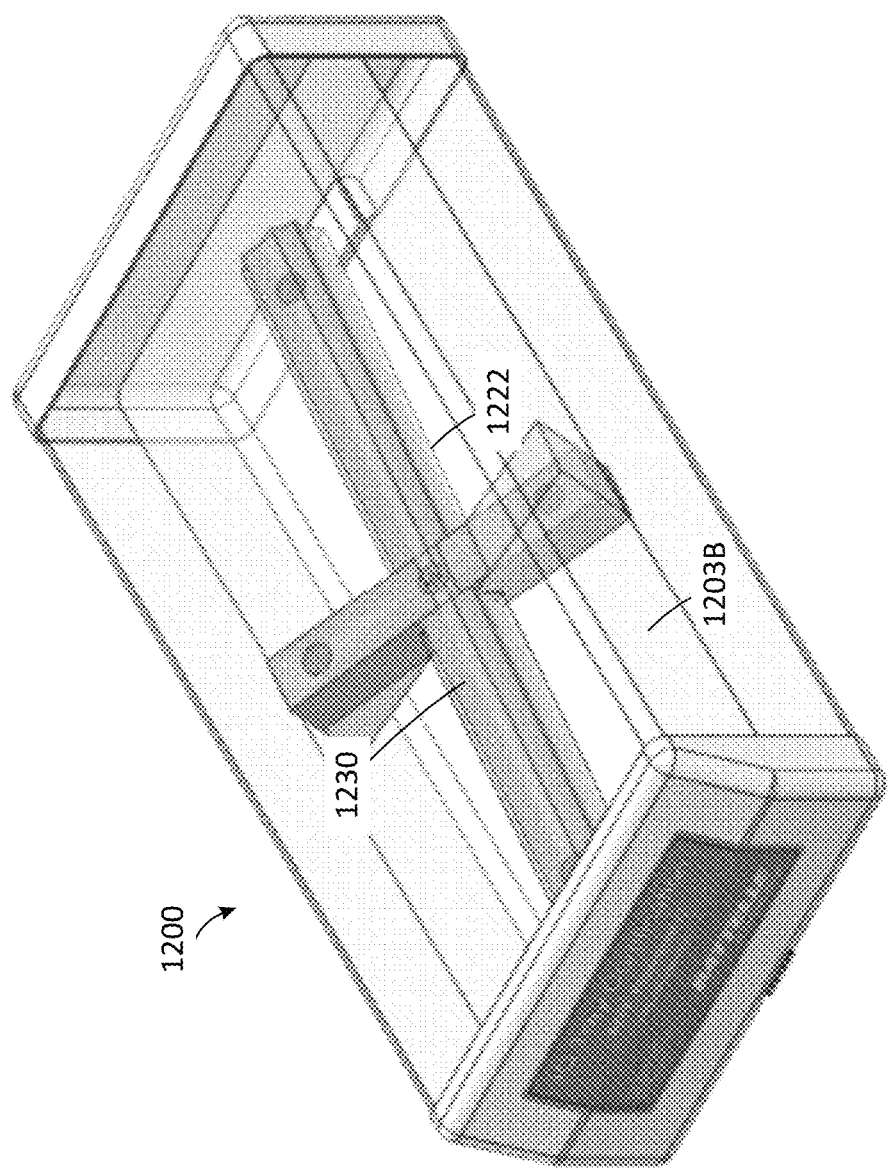
FIG. 12A is a perspective and assembled view illustrating a tray insert according to the twelfth embodiment of this application.
Figure 12B:
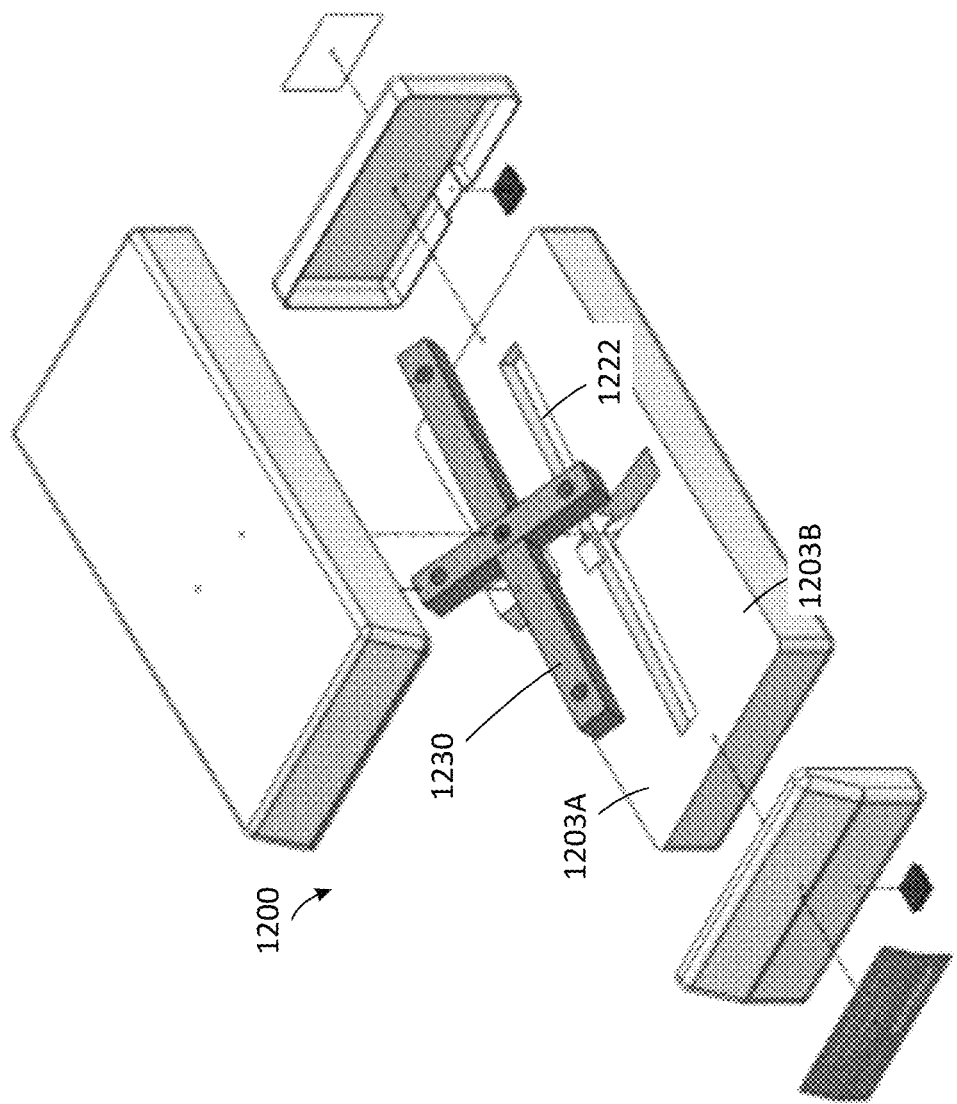
FIG. 12B is an exploded view illustrating the tray insert shown in the FIG. 12A.

FIGS. 12A and 12B illustrate a tray insert 1200 according to the twelfth embodiment of this application. FIG. 12A is a perspective and assembled view illustrating the tray insert 1200 and FIG. 12B is an exploded view illustrating the tray insert shown in the FIG. 12A. This tray insert 1200 may be a Modulation Transfer Function (MTF) Phantom B corresponding to the phantom No. 11 in Table 1. A difference between this tray insert 1200 and the one 1100 in the eleventh embodiment is the rod assembly 1230 tilts to the right-hand side of the tray insert 1200.

Figure 13A:
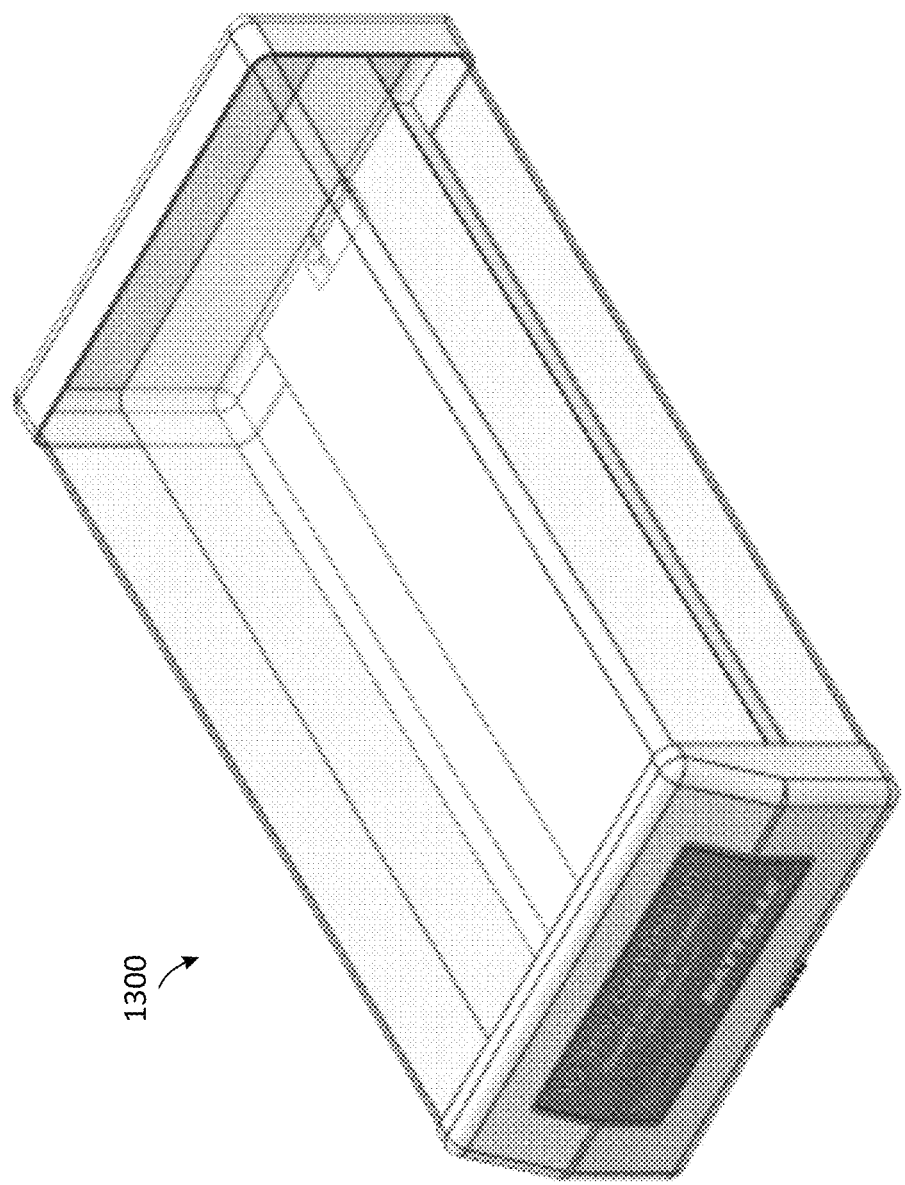
FIG. 13A is a perspective and assembled view illustrating a tray insert according to the thirteenth embodiment of this application.
Figure 13B:
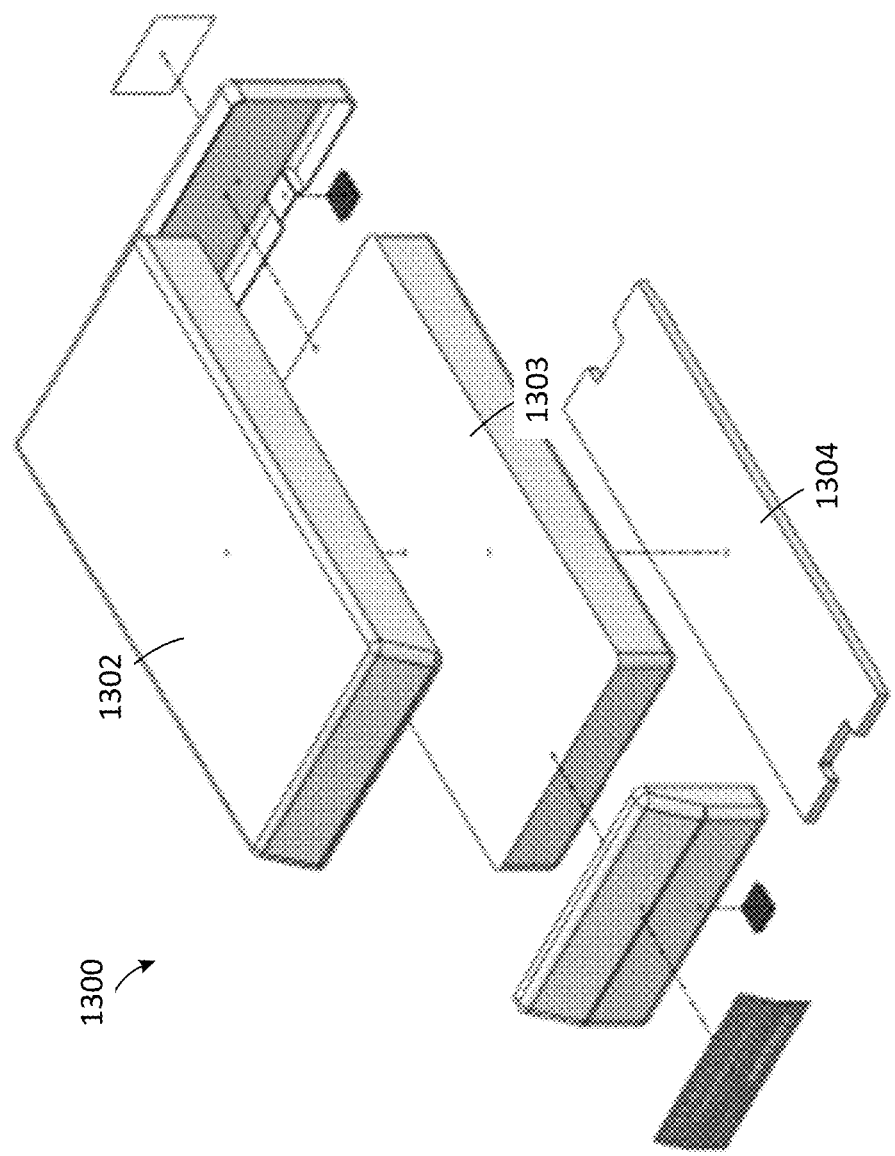
FIG. 13B is an exploded view illustrating the tray insert shown in the FIG. 13A.

FIGS. 13A and 13B illustrate a tray insert 1300 according to the thirteenth embodiment of this application. FIG. 13A is a perspective and assembled view illustrating the tray insert and FIG. 13B is an exploded view illustrating the tray insert shown in the FIG. 13A. This tray insert 1300 is a Sheet on Belt tray insert corresponding to the phantom No. 12 in Table 1. The tray insert 1300 may include at least the following components (from top to bottom): a covering 1302, a plate 1303 and a sheet 1304. Preferably, the plate 1303 is 10 mm Thick. Preferably, the plate 1303 is made from Acetron®. The plate's 1303 thickness may vary in different variants of this embodiment. Also, the material(s) of the plate 1303 may also vary in different variants of this embodiment, which is sandwiched between the covering 1302 and the sheet 1304.

Figure 14A:
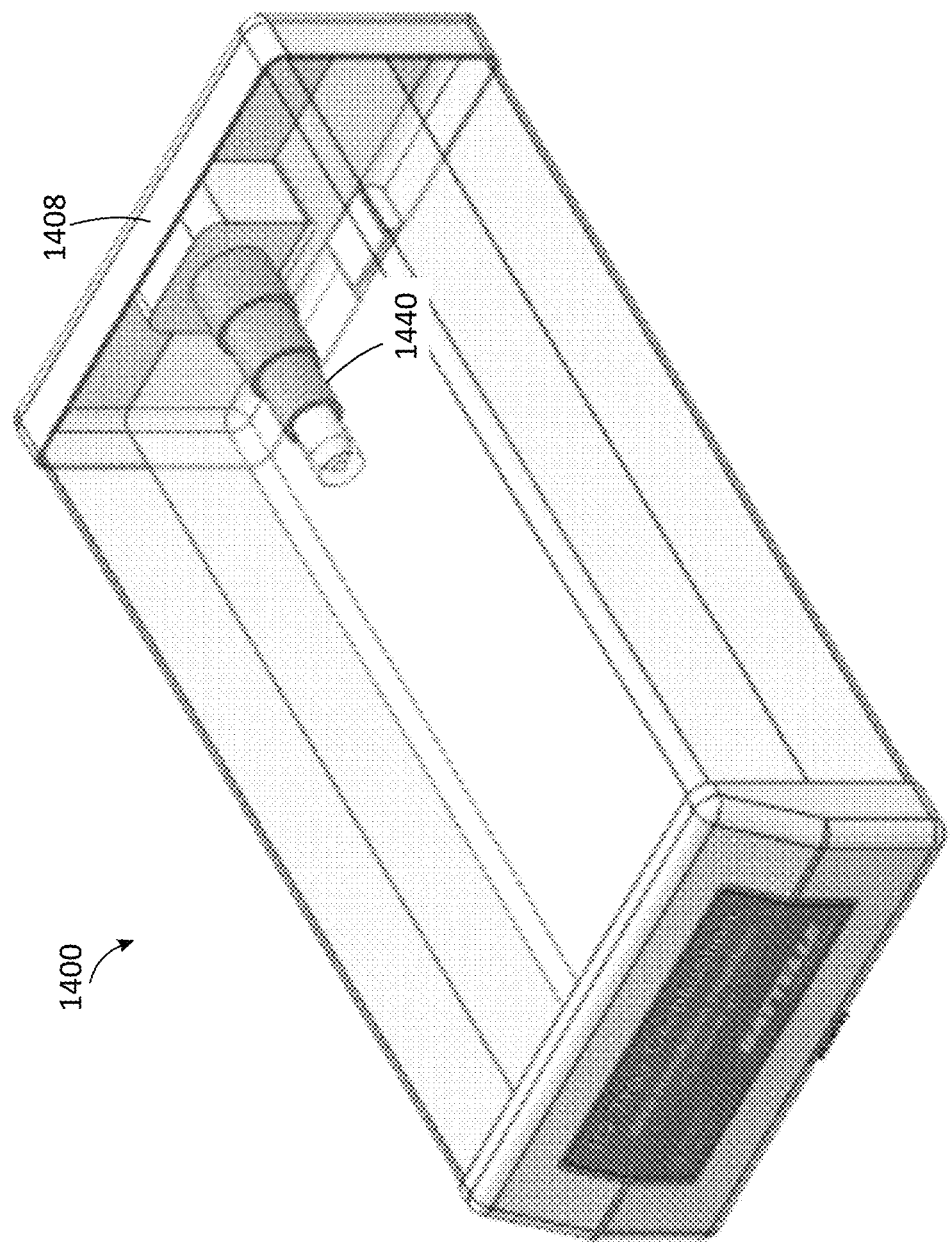
FIG. 14A is a perspective and assembled view illustrating a tray insert according to the fourteenth embodiment of this application.
Figure 14B:
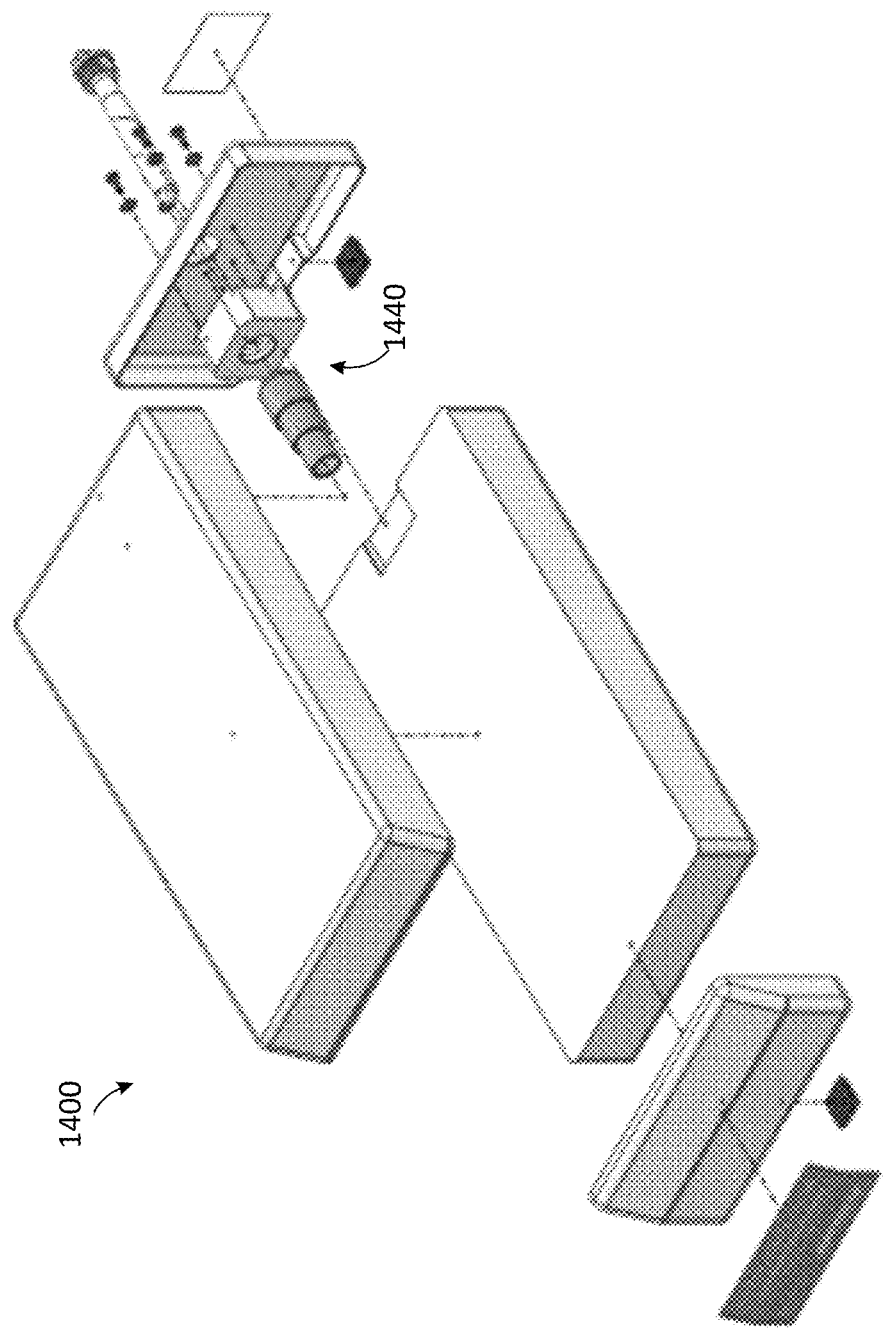
FIG. 14B is an exploded view illustrating the tray insert shown in the FIG. 14A.

FIGS. 14A and 14B illustrate a tray insert 1400 according to the fourth embodiment of this application. FIG. 14A is a perspective and assembled view illustrating the tray insert 1400 and FIG. 14B is an exploded view illustrating the tray insert 1300 shown in the FIG. 13A. This tray insert 1400 is a Wire Resolution tray insert corresponding to the phantom No. 13 in Table 1. The tray insert 1400 may include at least the following components: a CT wire resolution probe assembly 1440. Preferably, the assembly 1440 is installed at the right end 1408 of the tray insert 1400.

Figure 15A:
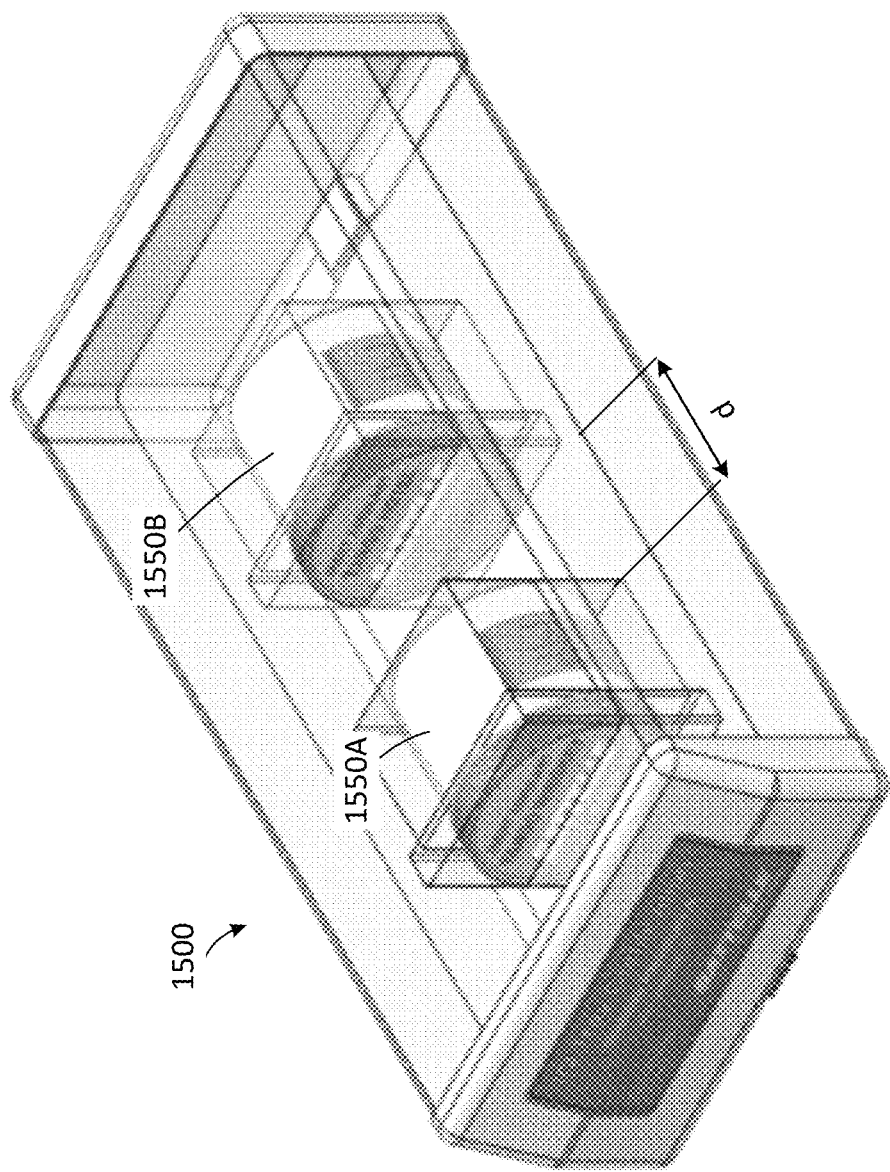
FIG. 15A is a perspective and assembled view illustrating a tray insert according to the fifteenth embodiment of this application.
Figure 15B:
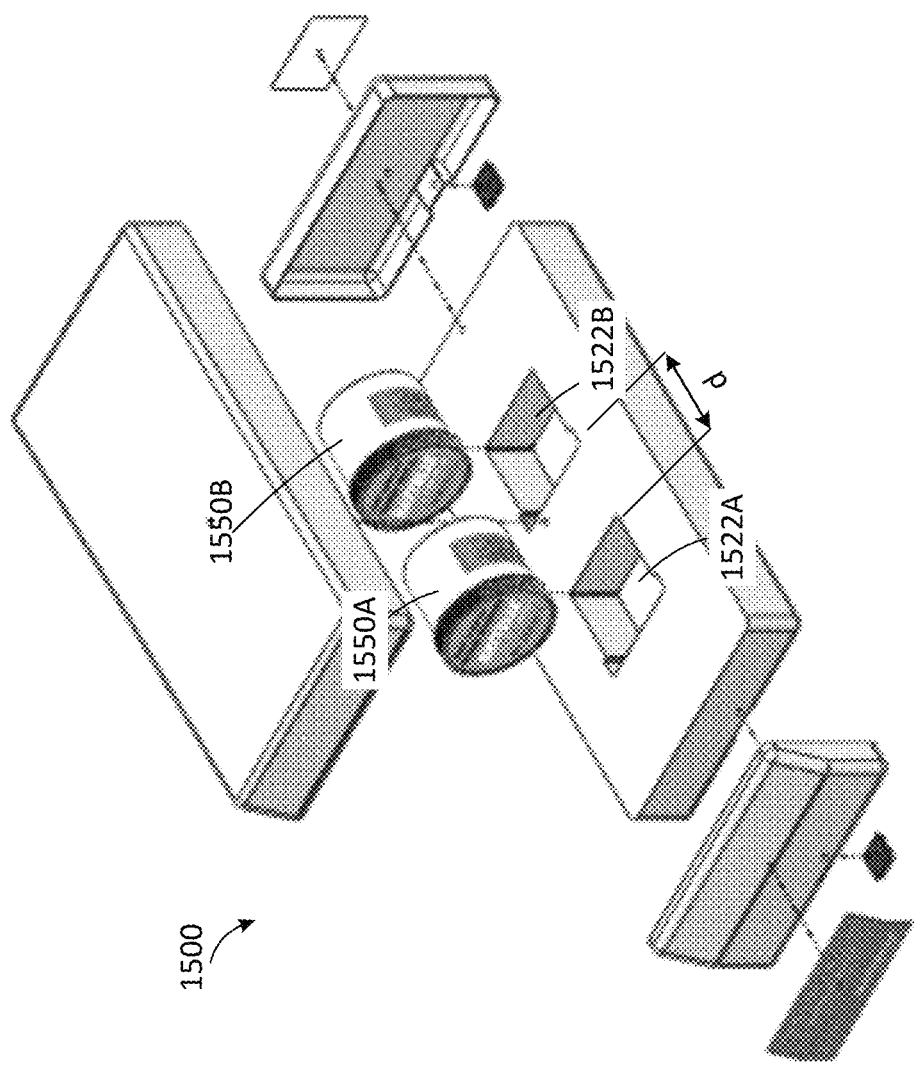
FIG. 15B is an exploded view illustrating the tray insert shown in the FIG. 15A.

FIGS. 15A and 15B illustrate a tray insert 1500 according to the fifteenth embodiment of this application. FIG. 15A is a perspective and assembled view illustrating the tray insert 1500 and FIG. 15B is an exploded view illustrating the tray insert 1500 shown in the FIG. 15A. This tray insert 1500 is a Stability Phantom A corresponding to the phantom No. 14 in Table 1. The tray insert 1500 may include at least the following components: two simulants 1550A, 1550B (e.g., Tango Whiskey & Tango Hotel shown in FIGS. 15A and 15B) positioned in grooves 1522A to 1522C, respectively. As shown in FIGS. 15A and 15B, there is a distance d between the simulants 1550A, 1550B.

Figure 16A:
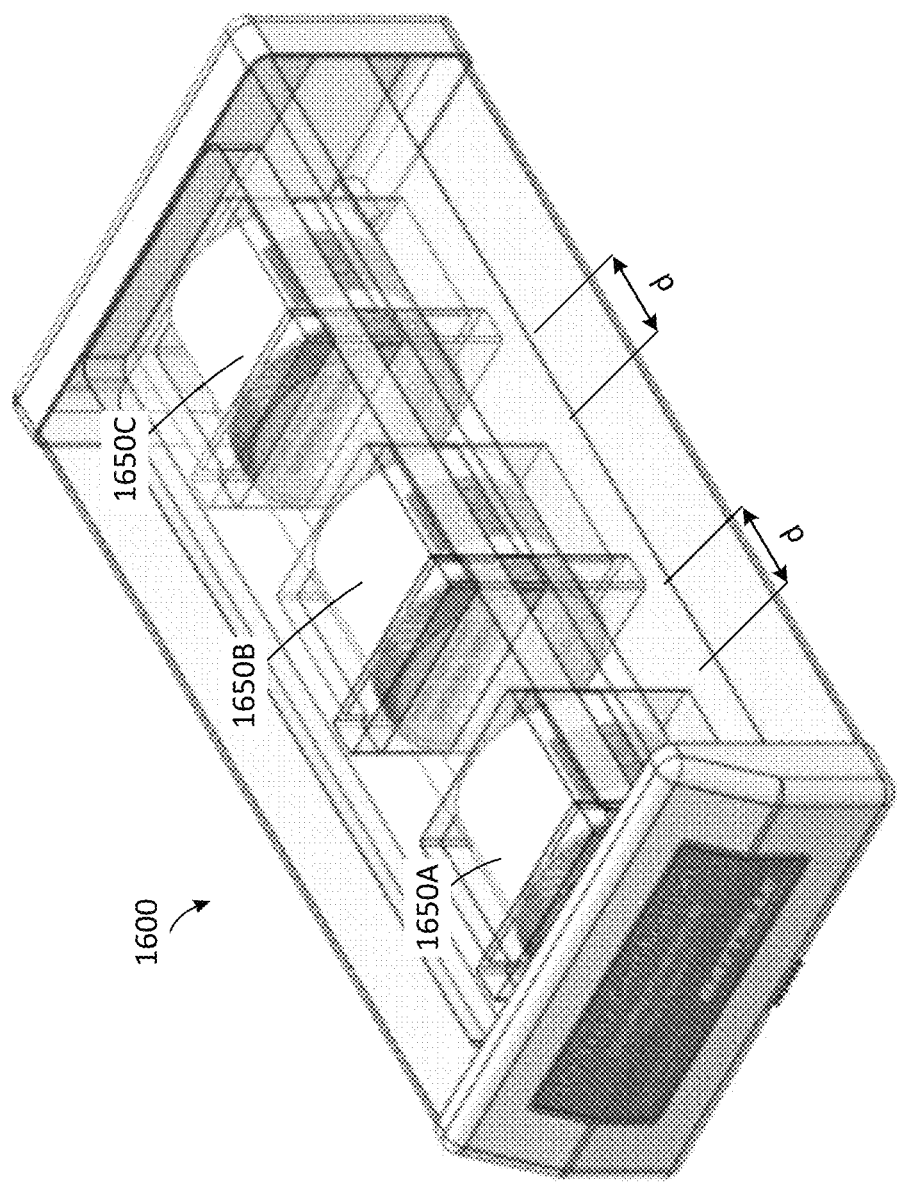
FIG. 16A is a perspective and assembled view illustrating a tray insert according to the sixteenth embodiment of this application.
Figure 16B:
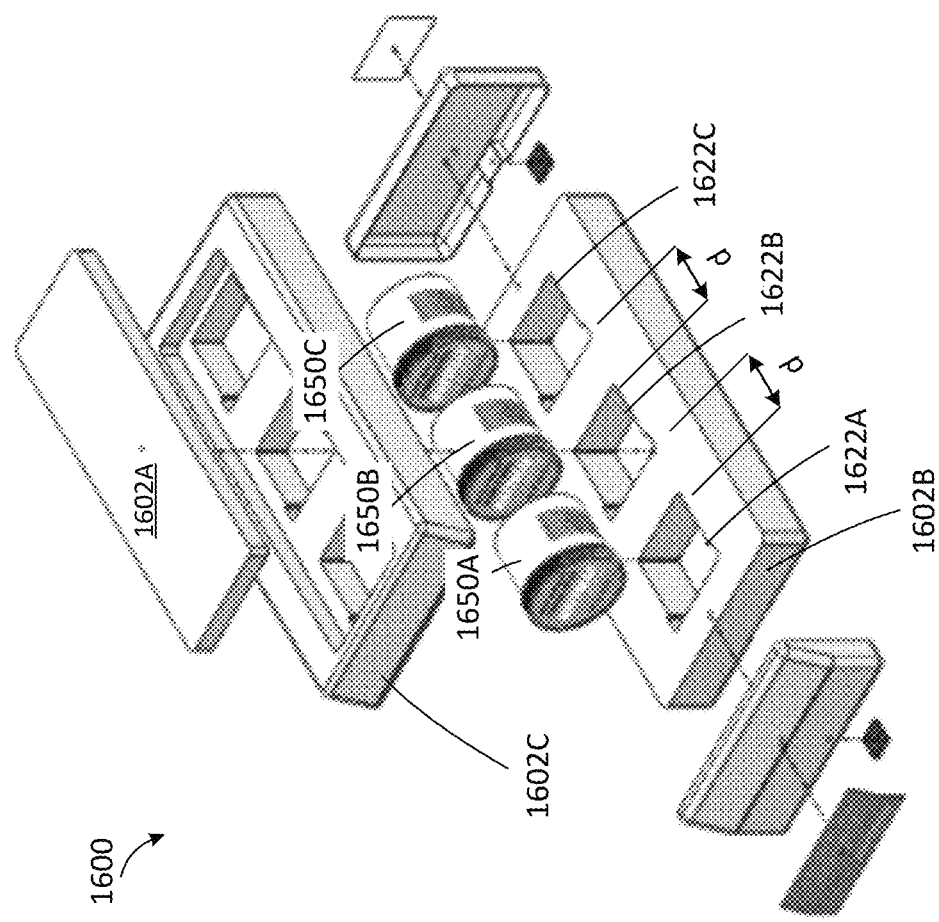
FIG. 16B is an exploded view illustrating the tray insert shown in the FIG. 16A.

FIGS. 16A and 16B illustrate a tray insert 1600 according to the sixteenth embodiment of this application. FIG. 16A is a perspective and assembled view illustrating the tray insert 1600 and FIG. 16B is an exploded view illustrating the tray insert shown in the FIG. 16A. This tray insert 1600 is a Stability Phantom B corresponding to the phantom No. 15 in Table 1. The tray insert 1600 may include at least the following components: three simulants 1650A, 1650B, 1650C (e.g., Tango Echo, Sierra India & Sierra Echo shown in FIGS. 16A and 16B) positioned in grooves 1622A to 1622C, respectively. As shown in FIGS. 16A and 16B, there is a distance d between the simulants 1650A, 1650B and 1650C.

Data collected through the tray inserts 1600 may support baseline data set development and statistical test methodology design. Once processed, data will be analyzed for inconsistencies in the establishment of a baseline data set to support test and evaluation of new X-ray system/tray configurations. Based on data distributions, appropriate statistical tests for each of the image metric parameters may be designed.

In embodiments, a blind test on a new X-ray system/tray variant configuration using the test phantoms and the established test methodology and baseline dataset may be performed. A tray insert designer or manufacturer may coordinate the collection of additional data on an X-ray system and tray variant (could be certified or uncertified, or both) and conduct a test on the collected data to validate the test approach. X-ray system/tray configurations will be pre-evaluated by the ECAC certifying body and assigned a certified or uncertified status, but this information will not be shared until after the contractor test/analysis is complete. Once the analysis/test is complete, results shall be compared with the ECAC results and refinements to the statistical test methodology shall be performed by the designer/manufacturer to optimize established acceptance thresholds discussed above.

Figure 17A:
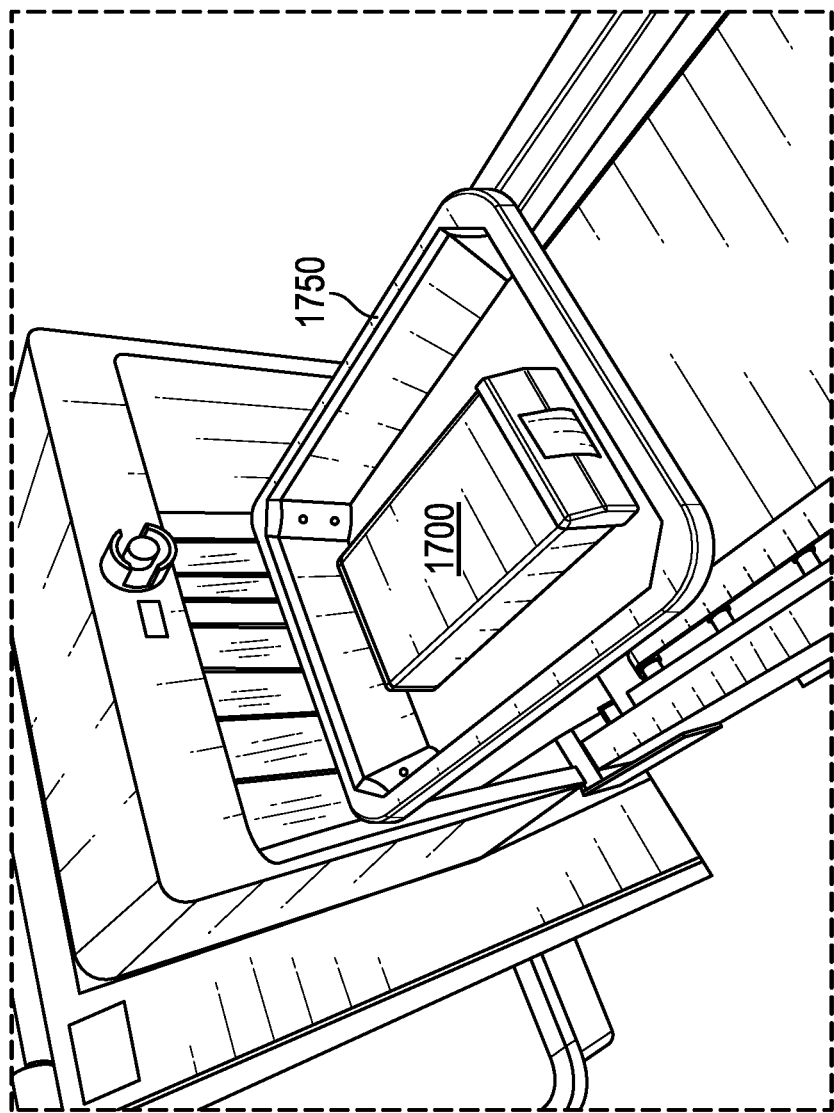
FIGS. 17A and 17B illustrate a tray insert used with a tray.
Figure 17B:
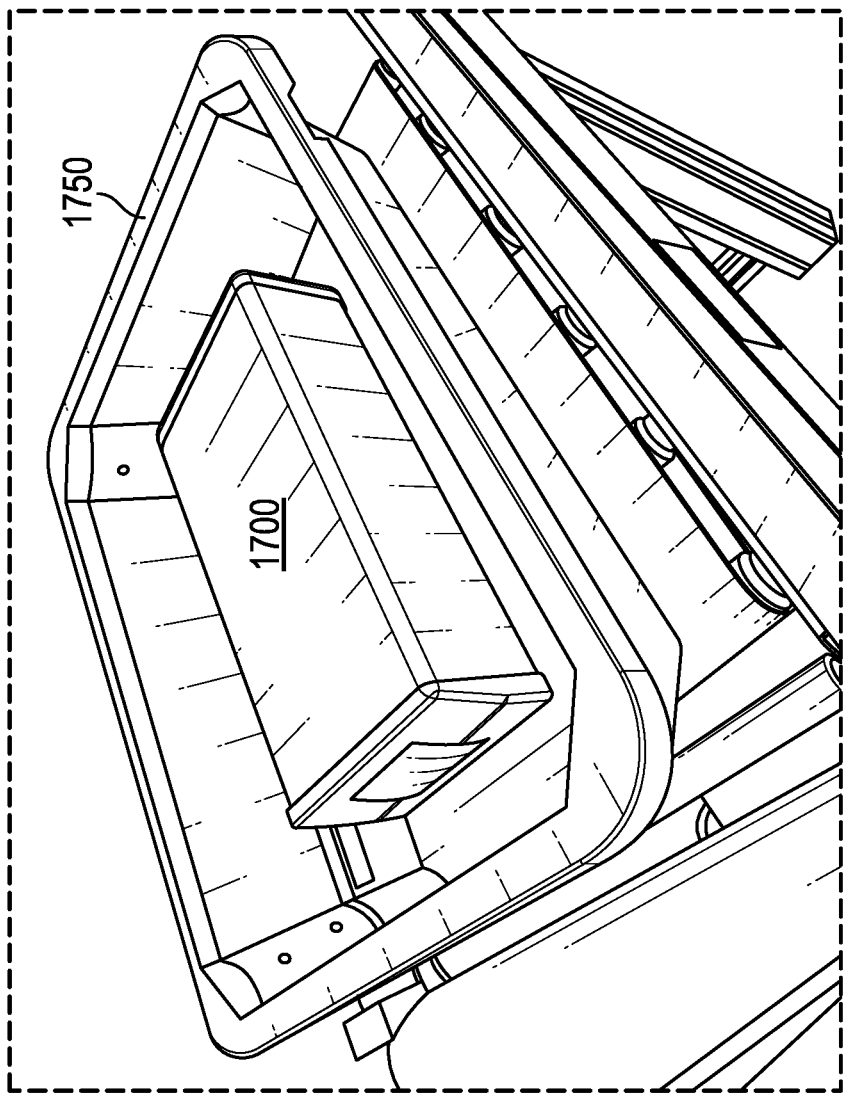

FIGS. 17A and 17B illustrate a tray insert 1700 used with a tray 1750 for tray certification. For example, a tray inert 1700 may be oriented according to the direction of the movement of the conveyor belt, which the tray insert 1700 may be centrally placed in tray 1750. The loaded tray 1750 (including the tray insert 1700) may be centrally placed on the conveyor belt of the X-ray system for image quality data and metrics extraction, to evaluate if the image quality of the tray insert 1700 is negatively impacted by the tray 1750 used in the evaluation, by comparing the extracted metrics with the baseline metrics of the approved trays which have been certified by the ECAC.

The technical effect which may be obtained by using the tray inserts to verify trays is briefly described as follows. The old certification methods already known on the market essentially run an experiment with explosives or explosive simulants to determine if the presence of a tray will have an effect on the X-ray system's explosive detection ability. This requires considerable amounts of time and is resulting in a backlog of systems waiting to be deployed making it difficult for many airports to meet corresponding mandates for migrating to newer X-ray technology. By contrast, the solution using the tray inserts may perform a certification test within minutes, and may be conducted at a manufacture's location, airports or any location where the X-ray system is installed. Typically, in such a solution, only approximately 10 minutes may be needed to collect images, run the image quality and statistical analysis and generate a report. FIGS. 18-20B may illustrate the tray certification method and algorithms as follows.

Figure 18:
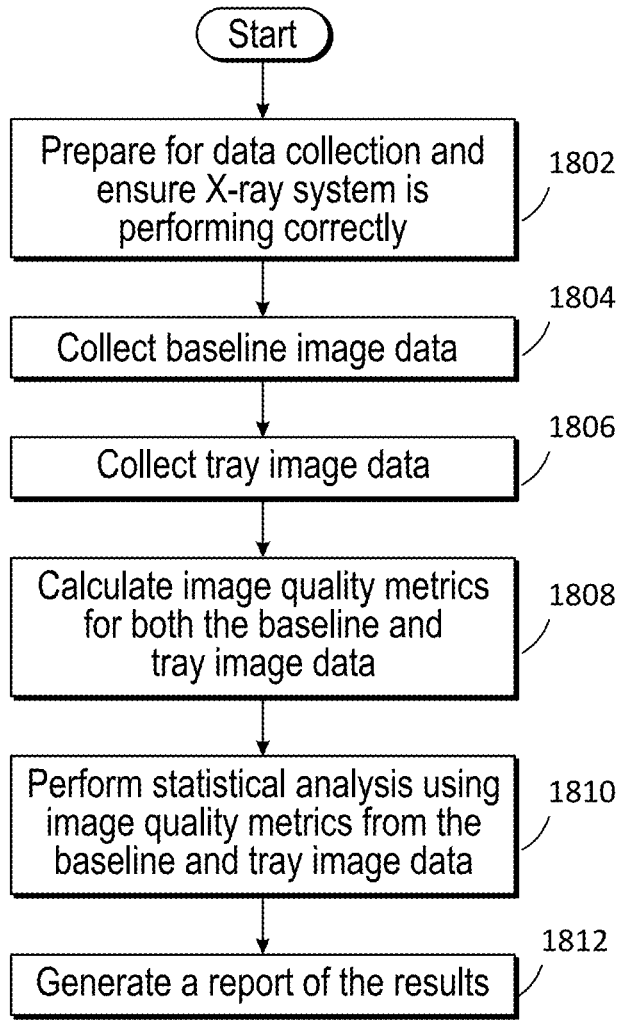
FIG. 18 is an overall flowchart depicting a method and an algorithm for certifying a tray using image quality (IQ) data of already certified tray by an X-ray system.

FIG. 18 is an overall flowchart depicting a method and an algorithm for certifying a candidate tray using image quality (IQ) data of already certified tray by an X-ray system.

In step 1802, prior to data collection, the X-ray system may be properly prepared to comply with data collection accuracy. For example, the tray under test (TUT) (i.e., certified tray or candidate tray) may be measured to confirm meeting the tray size requirements listed in an applicable user manual for one or more X-ray systems. Any oversized or undersized dimensions may impact placement of a tray insert or may obstruct the imaging or feeding movement of the tray in the X-ray system. In an example, the TUT should have a minimum tray size measured as 17 inches×8.5 inches. For Advanced Technology (AT) two-dimensional (2D) X-ray, the tray height (i.e., certified tray or candidate tray) should be at least 4 inches tall.

The preparation step 1802 may further include a selection of a correct tray insert (phantoms) to be used for the tray certification:

a. Select correct phantoms (i.e., tray insert)
  i. Identify the test phantoms required for data collection for the scanner system being evaluated.
  ii. Phantoms specifically for Advanced Technology (AT) X-ray and Computer Tomography (CT) X-ray. The labels on the phantoms may indicate whether they are to be used with AT or CT X-ray.
  iii. For AT X-ray need to select phantoms based on X-ray source location

TABLE 3

| Source Location | Dual Energy Phantom | MTF Phantom |
| --- | --- | --- |
| Left | #3 | n/a |
| Right | #4 | n/a |
| Bottom | #5 | #9 |
| Lower Left | #6 | #10 |
| Lower Right | #7 | #11 |

2D Phantom Selection (System Viewed Along Direction of Belt Travel):

b. Ensure X-ray system is running correctly
  i. Startup scanner system according to manufacturer's instructions. Process the Operational Test Kit (OTK) according to the manufacturer's instructions. System may be required to be switched to OTK mode.
  ii. For additional assurance, it is suggested that the machine pass a Tray User's Manual system.

In step 1804, baseline image data may be collected:

a. Capture metadata
  i. Use the DataCollectionPlanTemplate file and fill out the relevant metadata for the system. Refer to Tray User Manual for a list of the required metadata (X-ray system serial number, ambient temperature and humidity).
b. Find and mark the centerline of the X-ray system.
  i. Mark the centerline of the scanner system belt for proper positioning of the certified tray on the belt. Refer to User Manual for measurement guidance.
c. Position phantom on X-ray system belt.
  i. Do not use the tray at this point.
  ii. Orient and place the phantom on the scanner system's belt according to the centerline. Refer to Tray User Manual for additional detail.
  iii. Phantom must be centered within +/−2 cm.
  iv. Phantom must be aligned straight with the direction of the belt +/−2 degrees.

d. Run each phantom through the system 100 times
  i. Process the first phantom through the scanner system 100 times. Tally the number of scans. Record the date and time for each image collected.
  ii. Repeat with each phantom.
e. Copy image files and record remaining data to be established as baseline data.
  i. Download the image files from the scanner system according to the manufacturer's instructions. Verify there are 100 images from each of the phantoms.
  ii. Record the remaining metadata in the DataCollectionPlanTemplate file. Refer to User Manual for a list of the required metadata.

In step 1806, candidate tray (Tray Under Test or TUT) image data may be collected:
a. Capture metadata
  i. Use the DataCollectionPlanTemplate file and fill out the relevant metadata for the system. Refer to Tray User Manual for a list of the required metadata (X-ray system serial number, ambient temperature and humidity).
b. Find and mark the centerline of the X-ray system
  i. Mark the centerline of the scanner system belt for proper positioning of the candidate tray on the belt. Refer to User Manual for measurement guidance.
c. Prepare tray
  i. Prepare to position the phantom inside the tray by measuring out the center of the tray. Refer to Tray User Manual for measurement guidance.
  ii. Mark the tray based off the measurements to identify the placement of the phantom. Affix the Velcro fasteners to the inside of the tray. Refer to User Manual.
d. Position phantom inside the tray.
  i. Orient, place, and affix the phantom inside the tray. Refer to Tray User Manual for additional detail.
e. Position tray on X-ray system belt.
  i. Orient and place the tray containing the phantom on the scanner system's belt according to the centerline. Refer to Tray User Manual for additional detail.
  ii. Tray must be centered within +/−2 cm
  iii. Tray must be aligned straight with the direction of the belt +/−2 degrees.
f. Run each phantom through the system 100 times
  i. Process the first phantom through the scanner system 100 times. Tally the number of scans. Record the date and time for each image collected.
  ii. Repeat with each phantom
g. Copy image files and record remaining data.
  i. Download the image files from the scanner system according to the manufacturer's instructions. Verify there are 100 images from each of the phantoms.
  ii. Record the remaining metadata in the DataCollectionPlanTemplate file. Refer to Step 9 in the Section 5.4 of the VIQ User Manual for a list of the required metadata.

In step 1808, image quality metrics of the TUT may be calculated. More specifically, a "z-slice" or a cross-section image of an object (i.e., the TUT) in the xy-plane at a specific z-location may be provided directly from the Explosive Detection Systems (EDS) to form volumetric data. A two-dimensional or one-dimensional projection may be calculated from three-dimensional data as follows:
Constructing Projections:
a. Assume that the volumetric image data are represented by a three-dimensional matrix $I(x,y,z)$
b. Two-dimensional projections, $I_{xy}$, $I_{xz}$, $I_{yz}$
  i. These are the projections of the three-dimensional volumetric image data onto a single plane.
  ii. $I_{xy}(x,y) = \Sigma_z I(x,y,z)$
    1. $I_{xy}$ is the projection onto the xy-plane. This is akin to looking through the object from front to back.
  iii. $I_{xz}(x,z) = \Sigma_y I(x,y,z)$
    1. $I_{xz}$ is the projection onto the xz-plane. This is akin to looking through the object from top to bottom.
  iv. $I_{yz}(y,z) = \Sigma_x I(x,y,z)$
    1. $I_{yz}$ is the projection onto the yz-plane. This is akin to looking through the object from side to side.
c. One-dimensional projections, $I_x$, $I_y$, $I_z$
  i. These are the projections of the three-dimensional volumetric image data onto a single plane
  ii. $I_x(x) = \Sigma_y \Sigma_z I(x, y, z)$
    1. $I_x$ is the projection onto the x-axis
  iii. $I_y(y) = \Sigma_z \Sigma_x I(x,y,z)$
    1. $I_y$ is the projection onto the y-axis
  iv. $I_z(z) = \Sigma_x \Sigma_y I(x, y, z)$
    1. $I_z$ is the projection onto the z-axis A rolling average (also moving average, running average) is a calculation to analyze data points by creating a series of averages of different subsets of the full data set. Given a series of data points and a fixed window size (subset size), the first element of the rolling average is obtained by taking the average of the initial fixed window size of the series. The subset is the modified by shifting forward, i.e., excluding the first data point in the subset, and including the next value outside of the subset.

The greatest rolling average routine finds the subset of data with the greatest average. This type of calculation is typically achieved with a linear convolution of two one-dimensional sequences (e.g. cony in MATLAB or numpy.convolve in Python).

The above paragraphs (creating image projections, calculating greatest rolling average) describe common methods used by multiple of the metric extraction routines. Another common method, calculating a mean and a standard deviation of CTN values within a volume of interest, may be performed as follows:
a. Assume a collection of z-slices in which regions of interest have been identified and masking has already been applied to zero out any pixels outside of the regions of interest.
b. Initialize the following running totals variables to zero: $CTN_{total}$, $CTN^2_{total}$, and number of pixels ($N_{counts\ total}$).
c. For each slice, z, within the volume of interest:
  i. Use the identified region of interest for the slice to create a mask, containing 1's for all pixels within the region of interest and 0's for all pixels outside.
  ii. Apply the mask to the slice image, leaving all pixels within the region of interest intact and setting all pixels outside to zero.
  iii. Count the number of non-zero pixels remaining in slice z ($N_{non-zero,\ z}$), sum the CTN and $CTN^2$ values for these pixels, and add these to the running totals.

$$CTN_{total} = CTN_{total} + \sum_{i=1}^{N_{non-zero,z}} CTN_i$$

$$CTN^2_{total} = CTN^2_{total} + \sum_{i=1}^{N_{non-zero,z}} CTN^2_i$$

$$N_{counts\ total} = N_{counts\ total} + N_{non-zero\ z}$$

d. Once all slices within the volume of interest have been processed, calculate the final mean and standard deviation metrics:

$$\overline{CTN} = CTN_{total}/N_{counts\ total}$$

$$\sigma_{CTN} = \sqrt{CTN^2_{total}/N_{counts\ total} - \overline{CTN}^2}$$

In step 1810, a report of the image quality of the TUT may be generated to indicate whether the TUT may be certified for use in the X-ray system. If not, what design features may be recommended for adjustments.

FIG. 19A-19F illustrate examples of X-ray artifacts impacted by tray design. In an example, each tray insert 1900 may be positioned substantially in center of a tray under test (TUT) 1950, and the TUT 1950 may be positioned in middle of scanning path of a system belt when performing the scanning in generating the image data.

Figure 19A:
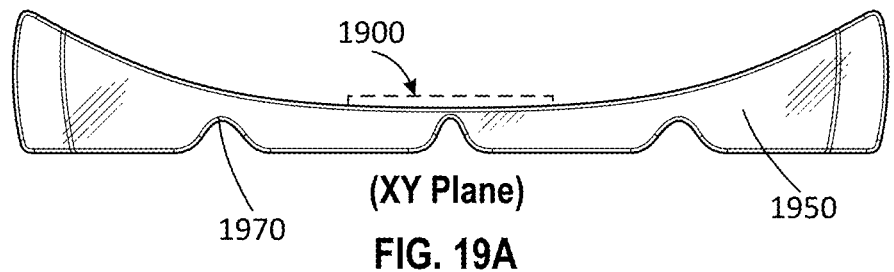
FIGS. 19A-19F illustrate examples of X-ray artifacts impacted by the tray design of after image data reconstruction
Figure 19B:
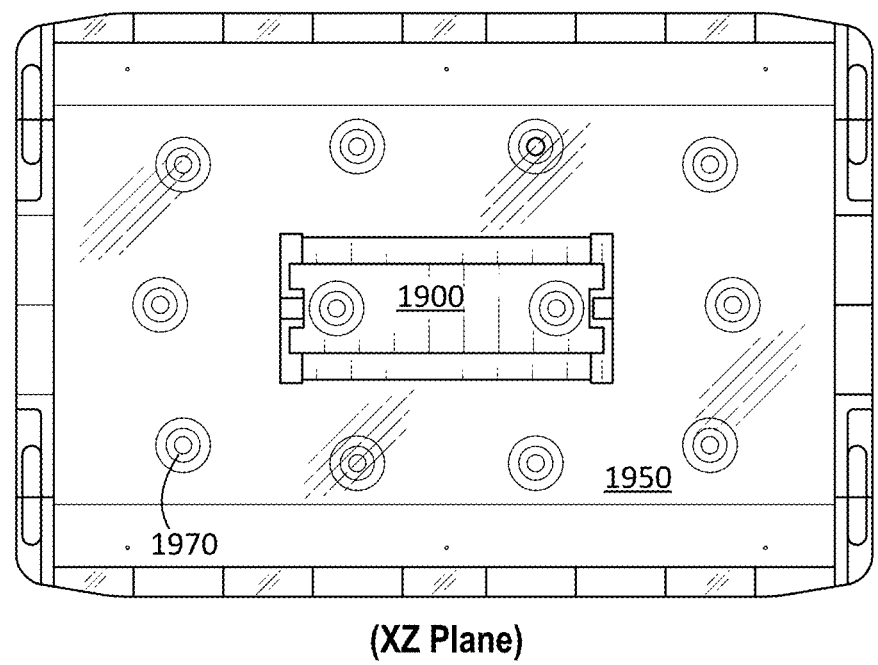
Figure 19C:
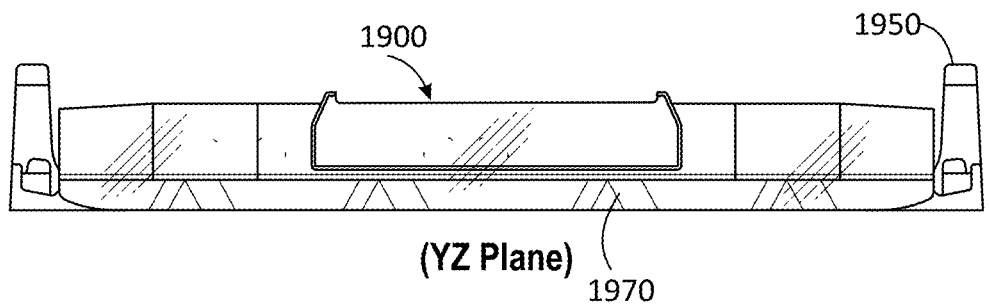

More specifically, FIGS. 19A-19C illustrate an X-ray scan of a tray insert 1900 (i.e., phantom #12) positioned in the center of the TUT 1950 in different projected planes (xy plane, xz plane and yz plane), wherein two-dimensional (2-D) projection images of the TUT 1950 with the tray insert 1900 may be reconstructed from the volumetric image data scanned in each of the different projected planes.

Figure 19D:
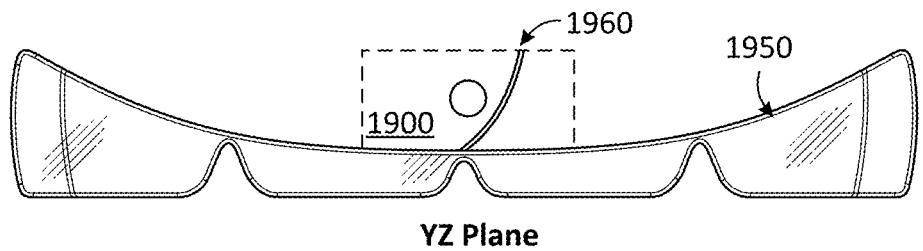
Figure 19E:
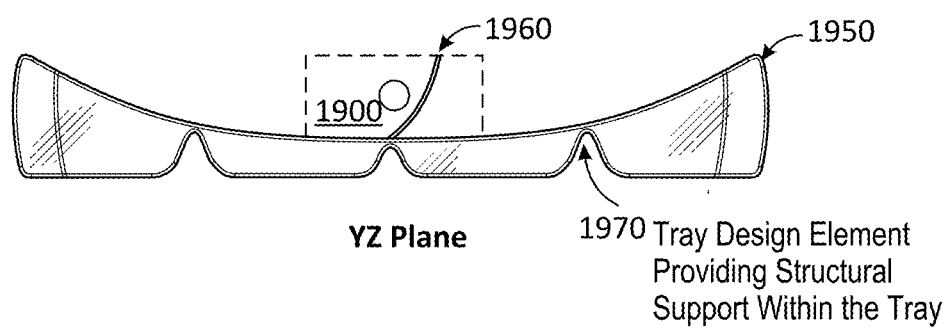
Figure 19F:
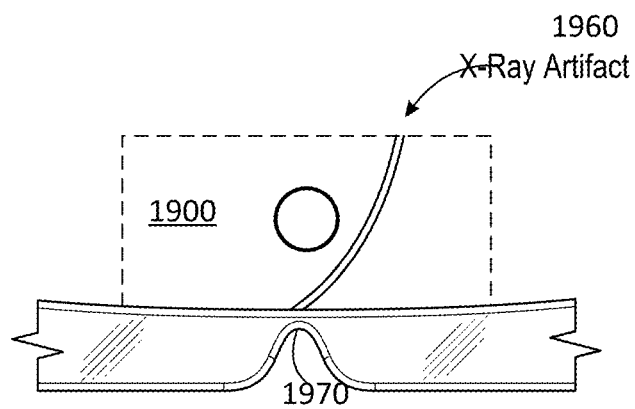

FIGS. 19D-19F illustrate examples of X-ray artifacts impacted by the tray design after image data reconstruction. FIG. 19D shows a sliced image profile (in yz plane) of the tray under test (TUT) 1950 having a tray insert 1900 (i.e., Phantom #1) centrally laid in the TUT. FIG. 19E shows that an X-ray artifact 1960, which may be shown as a streak feature through the tray insert 1900, which may be caused by one or more structural support 1970 beneath the TUT 1950. FIG. 19F is a close-up image showing the X-ray artifact 1960 caused by the one or more structural support 1970. The X-ray artifact 1960 may be reported as feedback to the tray manufacturer for redesign or modification until the tray passes certification.

Figure 20A:
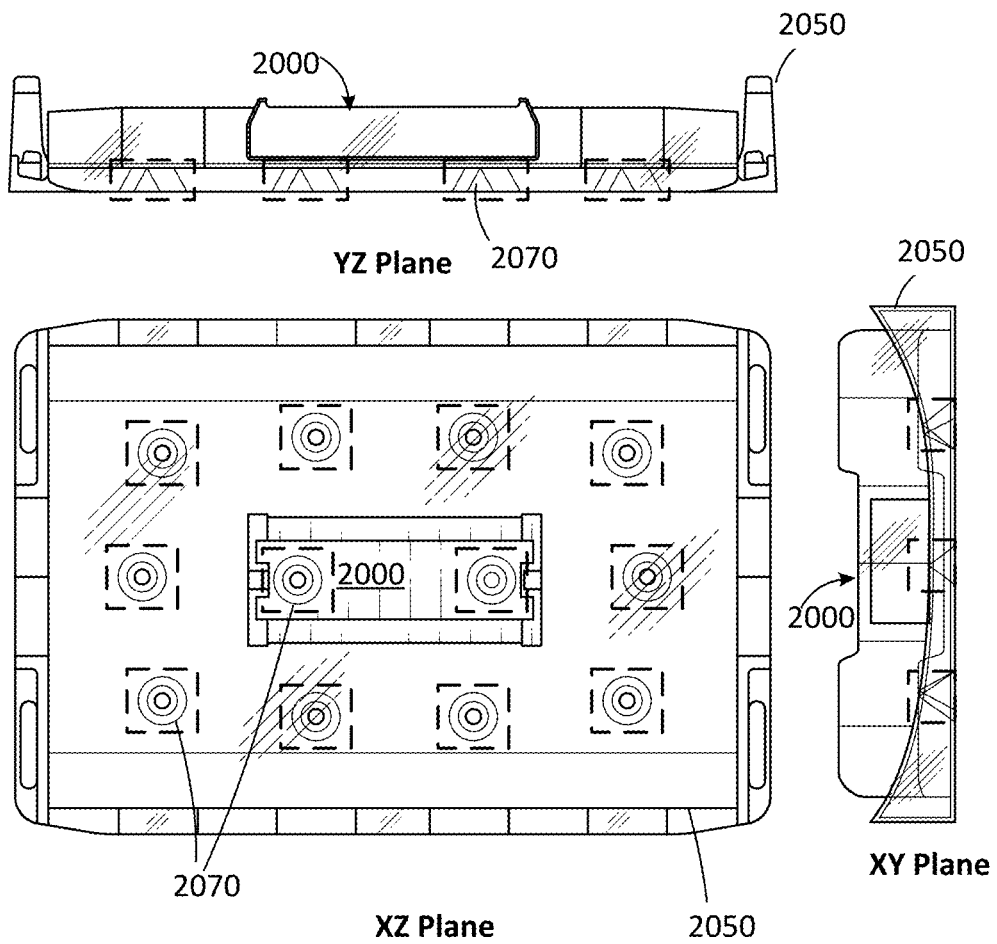
FIGS. 20A-20B illustrate an example of metrics extraction process to circumvent certain tray design impacts.
Figure 20B:
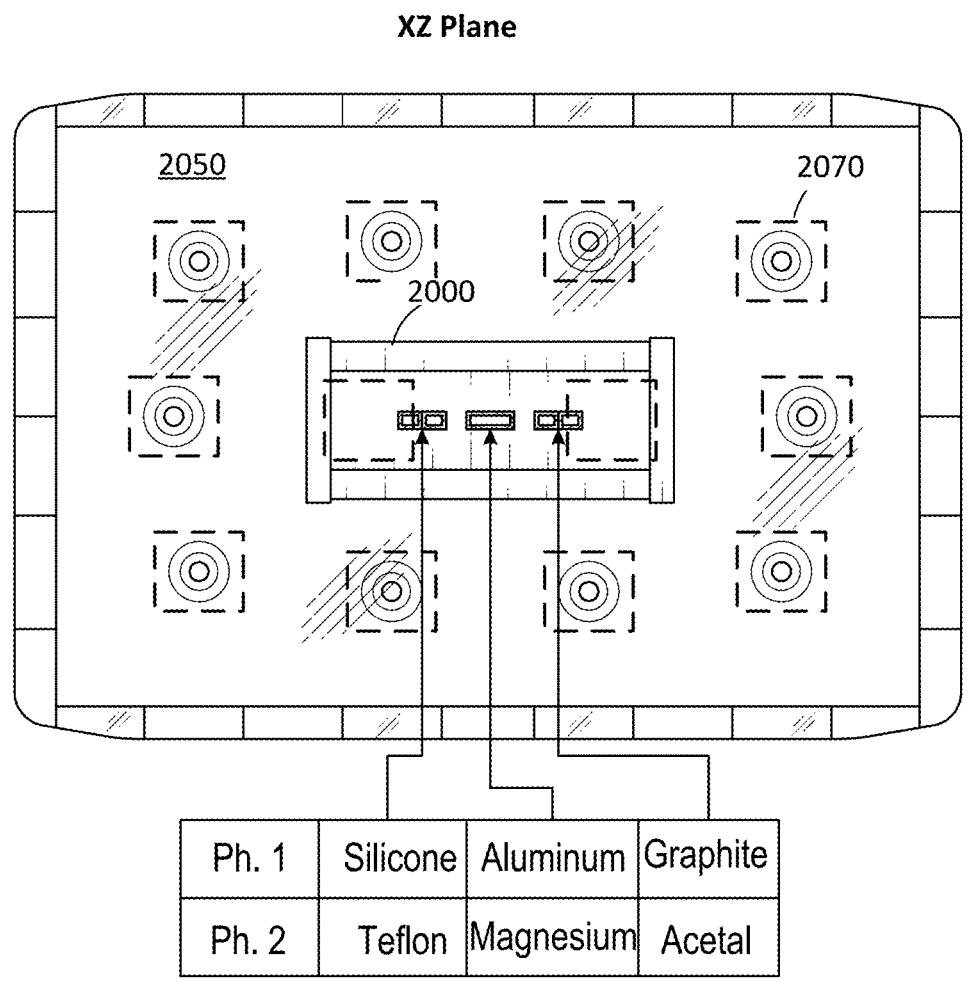

FIGS. 20A-20B illustrate an example of metrics extraction process to investigate certain tray design imp acts. As pointed out in the description of FIG. 19D to 19F, some support structures 2070 (e.g., legs, stands) formed beneath the TUT 2050 may come in different shapes, such as conical shape or rectangular shape may overlap with a selected tray insert 2000 to generate X-ray artifacts. The extracted metrics from the image of the multiple parts (such as the Silicone part, Aluminum part, Graphite part, or the Teflon part, Magnesium part and Acetal part) within the selected test insert 2000 may have varying degrees of impacts which may still be within an acceptable threshold limit, and thus may be ignored in the calculations.

Image quality metrics may be extracted from a particular tray insert, using a tray certification algorithm. In an example, the tray certification Image Quality (IQ) algorithm may extract metrics from scanned images of the tray under test (TUT) including the tray insert which are generated from the Advanced Technology (AT) two-dimensional (2D) X-ray. Some examples of the metrics or parameters which are extracted from the AT machine may include:

Material Linear Attenuation: The linear attenuation coefficient is measured for the multiple parts inside the tray insert, such as 6 cylinders of high purity (Copper, Aluminum, Graphite, Teflon, Magnesium, Acetal). This attenuation coefficient may be measured for both the high and low energy x-ray beams.

Z-Effective linearity: From the previously measured linear attenuation coefficients a linear fit may be performed of the high-to-low ratios versus the materials effective atomic number.

Effective Energy: The effective beam energy for the high and low energy sources may be calculated by looking at the linear attenuation coefficients across the set of high purity material cylinders.

MTF: The Modulation Transfer Function may be measured across a spectrum of frequencies (spatial resolutions).

Simulant Linear Attenuation: The liner attenuation coefficient is measured for 6 different types of explosive simulants.

In another example, the tray certification Image Quality (IQ) algorithm may extract metrics from scanned images of the tray under test (TUT) including the tray insert which are generated from the computed tomography (CT) three-dimensional (3D) X-ray. Some of the metrics or parameters which are extracted from the CT EDS, in addition to those described above for the AT machine, may include:

Material CT Number: The CT number may be measured for the multiple parts of the 6 cylinders of high purity (Silicone, Aluminum, Graphite, Teflon, Magnesium, Acetal) inside the selected tray insert (e.g., using Phantom #1 and 2).

Slice Sensitivity Profile: The spatial resolution along the direction of belt travel may be measured by imaging a slanted acetal bar.

CT Consistency: The consistency of the measured CT number may be determined by measuring its values across a large cylinder of uniform Acetal.

Simulant CT Number: The CT number may be measured (using Phantom #12-15) for 6 different types of explosive simulants (TNT, Ammonium Nitrate, and Nitroglycerine, to name a few).

The below information describes the process of image quality metric calculation for the TUT using certain selected phantom as tray inserts from Table 1:

Tray Phantoms 1 and 2
  a. Estimate roughly which slices contain the phantom.
    i. Project the volumetric image data onto the z-axis to obtain the one-dimensional z-projection, $I_z$.
    ii. Estimate the slices containing the phantom.
      1. Use a window size equal to the length of the phantom (17 in=431.8 mm)
      2. Define the slices containing the phantom as the subset (with size equal to the window size defined above) of $I_z$ with the greatest rolling average.
    iii. Exclude slices from the first and last 1.5 in (38.1 mm) to exclude the front and back caps of the phantom.
  b. Determine the centerline of the phantom, essentially giving the orientation of the phantom in the xz- and yz-planes. This step will also identify circular regions of interest (ROI) within slices.
    i. For each z-slice, attempt to identify a circle with radius approximately equal to that of one of the test objects (i.e. the cylinders, whose radius ~15.875 mm). Only circles with the appropriate radii will be included.
      1. Note, a circle will not be found in every slice, as the test objects will not be found in every slice.
      2. Appropriate thresholds should be utilized in combination with methods to eliminate small connect objects and holes to rid the image of as much noise as possible.

ii. Using the collection of found circles, fit a straight line through their centers. This defines the centerline of the phantom.
1. Fit separately the collections of ($x_{circle}$, $z_{slice}$) and ($y_{circle}$, $z_{slice}$). The result will be a line representing the orientation of the phantom in the xz-plane and a line representing the orientation of the phantom in the yz-plane.
iii. The identified circular regions of interest should be store din such a manner as they can be easily retrieved for a given slice. These will be utilized later when performing the actual metric extraction calculation.
iv. The centerline determined here can be utilized to ensure that the object is presented at an acceptable orientation. A flag can be input to fail the analysis if the presentation is not within thresholds.
c. Identify the z-slices containing the three test objects (z-ROIs).
i. Create a two-dimensional projection of the volumetric image data onto the xz-plane, $I_{xz}$.
ii. Take the CTN threshold to be the sum of the CTN of air/foam plus the average CTN of $I_{xz}$.
1. Approximate the CTN of air as the most frequent CTN value in the $I_{xz}$.
a. The phantom is mostly empty, so the most frequent value encountered should be that of air/foam.
iii. Using the threshold CTN, create a mask which will select only pixels whose CTN value is greater than that of the threshold.
iv. Apply this mask to $I_{xz}$, leaving approximately only pixels containing the test articles, with all other pixels empty.
v. Use an acceptable image processing algorithm to locate the three test objects, which will appear as rectangles in the xz-projection.
d. Knowing the length of each test object cylinder (~76.2 mm) and the spacing between the cylinders (~37.846 mm), ensure that the located regions of interest roughly equal what would be expected.
e. Using the z-slices containing the objects (z-ROIs) together with the previously found circular regions of interest within each slice (which together define the three volumes of interest), extract the metrics from each test object.
i. This amounts to calculating the average and standard deviation of the CTN values within the volume of interest.

Tray Phantom 8:
f. CT Value Consistency
i. This set of metrics is extracted from the cylindrical test object within the phantom.
ii. Obtain 64 images of the cylindrical test object. If the system cannot create 64 images (due to slice size, etc.), take the maximum number possible while avoiding the leading and trailing edges of the object.
iii. Define a circle of interest in each image that has a radius 10 mm less than the radius of the test object, centered on the test object within the image. Define the group of voxels that are completely enclosed within the circle of interest for each image.
iv. Calculate the mean and standard deviation of the CT value for each voxel group. Calculate the median and the standard deviations of the set of means and the set of standard deviations.

g. Slice Sensitivity Profile (SSP)
i. Locate the test object and designate a right-rectangular volume ROI, I(x,y,z), containing the leading, trailing, top and bottom faces of the test object but not the side faces.
ii. Generate a coronal image, $I_c(x,z)$ of the test object by summing all CT values within the ROI along the y-axis. The coronal image is oriented so that each horizontal row is specified by a different x value.
iii. Computer the centerline of the test object:
1. Calculate a center of mass, $com_x$, for each row (in z) in the ROI as shown in the following equation:

a. $$com_x = \frac{\sum_{z=0}^{z_{max}} z \cdot I_C(x, z)}{\sum_{z=0}^{z_{max}} I_c(x, z)}$$

b. where x is the x coordinate of the row
i. $z_{max}$ is the maximum z value in the ROI
2. Fit a line in the xz-plane to the set of all $com_x$.
iv. For each row in the ROI, compute the edge spread function as follows:
1. Compute the z distance of each pixel in the ROI from the centerline.
2. For each row, scale the pixel values by the maximum CT value measured within the ROI to correct for beam hardening and scatter effects.
3. Generate a table of all pixel values within the ROI in the order of their distance from the centerline.
4. Using the methods specified in ASTM E1695-95 (2013) starting at 7.1.1.5 and continuing through 7.1.3.3, generate the edge response function, point spread function, and the modulation transfer function using grayscale images.

Tray Phantom 12:
A. Estimate roughly which slices contain the phantom.
a. Project the volumetric image data onto the z-axis to obtain the one-dimensional z-projection, T.
i. See "Constructing projections" in GeneralTechniquesAndDefinitions.docx for more information.
b. Estimate the slices containing the phantom.
i. Use a window size equal to the length of the phantom (17 in=431.8 mm)
ii. Define the slices containing the phantom as the subset (with size equal to the window size defined above) of $I_z$ with the greatest rolling average.
iii. See "Greatest rolling average" in GeneralTechniquesAndDefinitions.docx for more information.
B. Identify the z-slices containing the test object (z-ROI)
a. Approximate the center of the phantom, which is also the approximate center of the test object, as the center of the slices found above.
b. The length of the test object acetal sheet, not including the notched ends, is 14.94 in (379.476 mm). To ensure the region of interest is sufficiently far from the ends of the test object, define the limits of the z-ROI to be within 6 in (152.4 mm) of the center slice (such that the entire z-ROI has a length of 12 in).
C. Define a rough region of interest in the x-direction (x-ROI).
a. The x-ROI is only used to build clean projections for other portions of the code.

b. Project the volumetric image data onto the x-axis to obtain the one-dimensional x-projection, $I_x$.
c. Estimate the x-pixels containing the phantom.
   i. Use a window size equal to the width of the phantom (5 in=127 mm)
   ii. Define the pixels containing the phantom as the subset (with size equal to the window size defined above) of $I_x$ with the greatest rolling average.
d. To ensure the x region of interest is away from the sides of the test object, define the rough x-ROI as within 2 in (50.8 mm) of the center (i.e. the width of the x-ROI is 4 in=101.6 mm).
D. Note: Treatment of the y-direction is different from the x- and z-directions, as it was discovered that the y-value of the center of the test object can vary with z.
   a. i.e., when looking at a yz-projection image, the test object is not always completely horizontal.
E. Determine the centerline of the phantom, essentially giving the orientation of the phantom in the xz- and yz-planes. This step will also identify rectangular regions of interest (ROI) within slices.
   a. Calculate the CTN threshold to be used in the masking.
      i. Use an xy-projection which includes only slices from the z-ROI, $I_{xy\ clean}$. This will help to smooth out any bright spots which may appear in single slices.
         1. Assuming the first z-slice of z-ROI is $z_1$ and the last is $z_2$:
         2. $I_{xy\ clean}(x,y)=\Sigma_{z=z_1}^{z=z_2}I(x,y,z)$
      ii. Determine the least bright pixel in the row containing the center of the test object, $CTN_{min\ of\ max\ row}$.
         1. Construct a one-dimension projection onto the y-axis, $I_y$ clean, using only slices within z-ROI and only pixels within the rough x-ROI. Assuming the first pixel of x-ROI is $x_1$ and the last is $x_2$:
         2. $I_{y\ clean}(y)=\Sigma_{x=x_1}^{x=x_2}I_{xy\ clean}(x,y)$
         3. Using the typical rolling average technique with $I_y$ clean, find the approximate center of the test object sheet in the y-direction, $y_{center,\ approx}$.
            a. Note, some care must be taken, as for baseline images the sheet is essentially directly on the belt, not above the belt at a distance equal to the height of the tray.
            b. See "Greatest rolling average" in GeneralTechniquesAndDefinitions.docx for more information.
         4. In a window surrounding the center $y_{center,\ approx}$, determine the brightest overall row in y, and set that as the center of the test object in the y-direction, $y_{center}$.
         5. Find the minimum CTN value within the rough x-ROI for this brightest row containing $y_{center}$.
            a. Define as $CTN_{min\ of\ max\ row}$
      iii. Determine the background CTN, $CTN_{background}$
         1. Look away from the test article in $I_{xy\ clean}$. The width of the test object is 5.0 in (127 mm). To ensure the background windows are outside of the test object, define the background regions of interest to not be within 3 in of the center of the test object in the x-direction.
         2. Find the maximum CTN values of the background in the region to the left and that to the right of the test object.
         3. Define the background CTN, $CTN_{background}$, value as the maximum of these two.
      iv. Ensure that the $CTN_{background}$ is less than $CTN_{min\ of\ max\ row}$.
         1. If this is not true, then applying the threshold will make the test object disappear.
      v. Define the CTN threshold, $CTN_{threshold}$ to be the background CTN found above divided by the number of slices included in the projection image (i.e. divided by $z_2-z_1+1$).
         1. $CTN_{threshold}=CTN_{background}/(z_2-z_1+1)$
         2. The division makes it such that the threshold is appropriate to apply to individual voxels, not voxels which have been projected down into pixels.
      vi. Define the standard CTN threshold, $CTN_{std}$, as $0.5(CTN_{water}+CTN_{air})$.
      vii. If the $CTN_{threshold}$ found is less than $CTN_{std}$, then use $CTN_{std}$ instead.
   b. For each slice in the z-ROI, find the rectangle within the image with dimensions closely matching those of the test object.
      i. Apply $CTN_{threshold}$ to create a black and white image.
      ii. Using appropriate image processing algorithm (e.g. bwareaopen in MATLAB), remove any connected areas less than the area threshold, which is currently set at 500 mm$^2$
      iii. In a similar fashion, remove any connected holes.
         1. This can be achieved by inverting the image (imcomplement in MATLAB) and utilizing the same technique as above for removing connected areas. Invert the image once again to recover the original BW image without any connected holes or areas.
      iv. Use appropriate image processing algorithms to identify rectangular objects within the remaining BW image.
      v. Enforce some quality metric to ensure that the shape recovered by the algorithm looks as expected. If multiple exist which pass the quality standard, select the best (although this should not happen). We implement the following procedure:
         1. Use regionprops to extract properties of identified regions within the image. At a minimum, 'Perimeter' and 'Area' must be collected.
         2. For a rectangle with height a and width b
            a. Area: $A=ab$
            b. Perimeter: $P=2(a+b)$
         3. Using the above equations for area and perimeter, one can solve for either the height or width, and find:

a. $0 = a^2 - \frac{P}{2}a + A$

4. Solving the above quadratic equation yields two roots, which represent the height a and width b of the region (assuming the region to be rectangular).
         5. Take the actual height and width of the test object to be $a_{actual}$ and $b_{actual}$, and the height of width of the identified region within the image to be $a_{region}$ and $b_{region}$. The quality metric determining how closely the found region matches the shape of the test object is:

a. $\text{quality} = \sqrt{\left(\frac{a_{actual} - a_{region}}{a_{actual}}\right)^2 + \left(\frac{b_{actual} - b_{region}}{b_{actual}}\right)^2}$ 6. For now, the maximum acceptable quality is set to 1.0. This is still a loose restriction which could be tightened, but it seems to be sufficient.

F. Using the z-slices containing the test object (z-ROI) together with the previously found rectangular regions of interest within each slice (which together define the volume of interest), extract the metrics from the test object.
  a. This amounts to calculating the average and standard deviation of the CTN values within the region of interest.

Tray Phantom 14 and 15:

Note: This is very similar to the methods used for Tray Phantoms 1 & 2

A. Estimate roughly which slices contain the phantom.
  a. Project the volumetric image data onto the z-axis to obtain the one-dimensional z-projection, $I_z$.
  b. Estimate the slices containing the phantom.
    i. Use a window size equal to the length of the phantom (17 in=431.8 mm)
    ii. Define the slices containing the phantom as the subset (with size equal to the window size defined above) of $I_z$ with the greatest rolling average.
  c. Exclude slices from the first and last 1.25 in (31.75 mm) to exclude the front and back caps of the phantom.

B. Determine the centerline of the phantom, essentially giving the orientation of the phantom in the xz- and yz-planes. This step will also identify circular regions of interest (ROI) within slices.
  a. For each z-slice, attempt to identify a circle with radius approximately equal to that of one of the test objects (i.e. the containers, whose body radius ~42.418 mm and cap radius is 46.863 mm). Only circles with the appropriate radii will be included.
    i. Note, a circle will not be found in every slice, as the test objects will not be found in every slice.
    ii. Appropriate thresholds should be utilized in combination with methods to eliminate small connect objects and holes to rid the image of as much noise as possible.
  b. Using the collection of found circles, fit a straight line through their centers. This defines the centerline of the phantom.
    i. Fit separately the collections of $(x_{circle}, z_{slice})$ and $(y_{circle}, z_{slice})$. The result will be a line representing the orientation of the phantom in the xz-plane and a line representing the orientation of the phantom in the yz-plane.
  c. The identified circular regions of interest should be stored in such a manner as they can be easily retrieved for a given slice. These will be utilized later when performing the actual metric extraction calculation.
  d. The centerline determined here can be utilized to ensure that the object is presented at an acceptable orientation. A flag can be input to fail the analysis if the presentation is not within thresholds.

C. Identify the z-slices containing the three test objects (z-ROIs).
  a. Create a two-dimensional projection of the volumetric image data onto the xz-plane, $I_{xz}$.
  b. the average CTN of $I_{xz}$.
    i. Approximate the CTN of air as the most frequent CTN value in the $I_{xz}$.
      1. The phantom is mostly empty, so the most frequent value encountered should be that of air/foam.
  c. Using the threshold CTN, create a mask which will select only pixels whose CTN value is greater than that of the threshold.
  d. Apply this mask to $I_{xz}$, leaving approximately only pixels containing the test articles, with all other pixels empty.
  e. Use an acceptable image processing algorithm to locate the three test objects, which will appear as rectangles in the xz-projection.
    i. For Tray Phantom 14, assert two test objects found. For Tray Phantom 15, assert three test objects found.

D. Knowing the length of each test object cylinder (~83.312 mm) and the spacing between the cylinders (~70.866 mm), ensure that the located regions of interest roughly equal what would be expected.
  a. Shift the minimum (front-end) of each z-ROI by the length of the cap (~17.526 mm) so as to include only the contents of the test object in the measurement and not the cap.

E. Using the z-slices containing the objects (z-ROIs) together with the previously found circular regions of interest within each slice (which together define the three volumes of interest), extract the metrics from each test object.
  a. This amounts to calculating the average and standard deviation of the CTN values within the volume of interest.

The above description are exemplary embodiments, which are not to be construed as limiting to only CT metrics, other embodiments or variations for the AT may similarly be derived under the interpretation of the ordinary skilled in the art.

It will be appreciated that the terminology used in the present application is for the purpose of describing particular embodiments and is not intended to limit the application. The singular forms "a", "the", and "the" may be intended to comprise a plurality of elements. The terms "including" and "comprising" are intended to include a non-exclusive inclusion. Although the present application is described in detail with reference to the foregoing embodiments, it will be appreciated that those foregoing embodiments may be modified, and such modifications do not deviate from the scope of the present application.

What is claimed is:

1. A computer implemented method to quantify X-ray scanner system's image quality impact by a candidate tray, the method comprising:

executing by at least a processor in a computer, at least one code stored in a non-transitory computer-readable medium which causes the computer to control an X-ray scanner system to quantify candidate tray impact, comprising:

collecting baseline image data for the X-ray scanner system that comprises characteristic image quality data collected from a plurality of certified trays that have been scanned with a plurality of selected tray inserts;

collecting one or more candidate trays image data for the X-ray scanner system that comprises characteristic image quality data collected from the one or more candidate trays that have been scanned with a same plurality of selected tray inserts;

extracting image quality metrics for both the baseline image data and the one or more candidate trays image data;

performing statistical analysis using the image quality metrics within a volume of interest from both the baseline image data and the candidate trays image data; and reporting or certifying the one or more candidate tray suitable for use in the X-ray scanner system based on the image quality metrics of the one or more candidate tray falling within a mean and a standard deviation of CTN values within the volume of interest.

2. The computer implemented method of claim 1, wherein the collecting of the baseline image data or the one or more candidate trays image data, comprising: taking turns to scan a defined number of times by the X-ray scanner system, one of the same plurality of selected tray inserts which has been centrally positioned in the plurality of certified trays or the one or more candidate trays, until the remaining selected tray inserts have been scanned with the plurality of certified trays or the one or more candidate trays by the X-ray scanner system.

3. The computer implemented method of claim 1, wherein the extracting of the image quality metrics for both the baseline image data and the candidate trays image data, comprising:

calculating a "z-slice" or a cross-section image, of the selected tray insert which has been positioned within either the plurality of certified trays or the one or more candidate trays, in the xy-plane at a specific z-location, and constructing a three-dimensional (3D) volumetric image data represented by a three-dimensional matrix $I(x,y,z)$, based on projections of the three-dimensional volumetric image data onto a single plane.

4. The computer implemented method of claim 1, wherein the performing of statistical analysis using the image quality metrics within a volume of interest from both the baseline image data and the candidate trays image data, comprising:

processing all z-slices in the volume of interest to calculate a final mean and standard deviation metrics, wherein each z-slice within the volume of interest containing 1's for all pixels within the region of interest and 0's for all pixels outside, and a number of non-zero pixels remaining in each z-slice ($N_{non-zero_2, z}$) are counted and summed to obtain CTN and $CTN^2$ values for all the pixels to yield running totals to calculate the final mean and standard deviation metrics:

$$\overline{CTN} = CTN_{total}/N_{counts\ total}$$

$$\sigma_{CTN} = \sqrt{CTN^2_{total}/N_{counts\ total} - \overline{CTN}^2}.$$

5. The computer implemented method of claim 1, comprising prior to the collecting of the baseline image data for the X-ray scanner system, preparing the X-ray scanner system for data collection accuracy by measuring physical dimensions of both the plurality of certified trays or the one or more candidate trays to meet tray size requirements.

6. The computer implemented method of claim 1, wherein the tray insert comprises:

a body, wherein the body having multiple parts removably positioned and prearranged therein for generation of image quality metrics for tray impact evaluation in an X-ray system;

a first cover disposed at a first end of the body; and a second cover disposed at a second end of the body, wherein the first cover and the second cover are configured to fix and secure the body at the both ends, wherein the multiple parts are configured for screening presence of explosive threats by the X-ray scanner system that utilizes screening technology comprising one of: two-dimensional (2-D) X-ray or X-ray computer tomography (CT).

7. The computer implemented method of claim 2, comprising orientating a front end of the selected tray insert to align with a same direction of belt movement of the X-ray scanner system.

8. The computer implemented method of claim 7, comprising rejecting the one or more candidate trays when the 3D volumetric image data exhibits presence of X-ray artifacts.

* * * * *